US012774249B2

(12) United States Patent
Pandey et al.

(10) Patent No.: US 12,774,249 B2
(45) **Date of Patent: *Oct. 27, 2026**

(54) PROCESS FOR TAILINGS STREAM SEDIMENTATION AND SEGREGATION

(71) Applicant: EnviCore Inc., Calgary (CA)

(72) Inventors: Aseem Pandey, Calgary (CA); Milana Trifkovic, Calgary (CA); Shahrukh Shamim, Calgary (CA)

(73) Assignee: EnviCore Inc., Calgary (CA)

( * ) Notice: Subject to any disclaimer, the term of this patent is extended or adjusted under 35 U.S.C. 154(b) by 487 days.

This patent is subject to a terminal disclaimer.

(21) Appl. No.: 18/268,946

(22) PCT Filed: Dec. 21, 2021

(86) PCT No.: PCT/CA2021/051865
§ 371 (c)(1),
(2) Date: Jun. 21, 2023

(87) PCT Pub. No.: WO2022/133600
PCT Pub. Date: Jun. 30, 2022

(65) Prior Publication Data
US 2024/0043330 A1 Feb. 8, 2024

Related U.S. Application Data

(60) Provisional application No. 63/128,639, filed on Dec. 21, 2020.

(51) Int. Cl.
*B03D 3/02* (2006.01)
*C02F 1/00* (2023.01)
(Continued)

(52) U.S. Cl.
CPC .................. *B03D 3/02* (2013.01); *C02F 9/00* (2013.01); *C02F 11/147* (2019.01); *C04B 14/10* (2013.01);
(Continued)

(58) Field of Classification Search
CPC ....... C04B 20/023; C04B 14/10; C04B 18/12; C04B 28/04; C04B 28/105; C04B 20/02;
(Continued)

(56) References Cited

U.S. PATENT DOCUMENTS 8,399,089 B1 * 3/2013 Veedu ...................... B32B 3/26 106/711
10,906,821 B2 * 2/2021 Trifkovic .................. C02F 1/56
(Continued)

FOREIGN PATENT DOCUMENTS

CA 1109408 A 9/1981
CA 1238597 A 6/1988
(Continued)

OTHER PUBLICATIONS

"Suncor Energy Inc. Tailings Reduction Operations Application", https://www.canoils.com/Universal/View.aspx?type=Story&id=4692, Oct. 28, 2009.
(Continued)

*Primary Examiner* — Pamela H Weiss
(74) *Attorney, Agent, or Firm* — Peacock Law P.C.; Marco H. Santamaria; Deborah A. Peacock

(57) ABSTRACT

A method for treatment of tailings including, but not limited to, mature fine tailings (MFT) from mine tailings, oil sands, coal tailings, industrial tailings, thin fine tailings (TF), and laterite tailings. The method comprises contacting the tailing with a deflocculant to reduce the yield stress and viscosity of the tailings, resulting in accelerated solid mineral sedimentation and segregation. The process may yield nanoclays (NCs) that may be used for NC compositions.

14 Claims, 19 Drawing Sheets

(51) Int. Cl.

| | |
|---|---|
| ***C02F 1/66*** | (2023.01) |
| ***C02F 9/00*** | (2023.01) |
| ***C02F 11/127*** | (2019.01) |
| ***C02F 11/145*** | (2019.01) |
| ***C02F 11/147*** | (2019.01) |
| ***C02F 103/10*** | (2006.01) |
| ***C04B 14/10*** | (2006.01) |
| ***C04B 18/12*** | (2006.01) |
| ***C04B 20/02*** | (2006.01) |
| ***C04B 28/04*** | (2006.01) |
| ***C04B 28/10*** | (2006.01) |

(52) U.S. Cl.
CPC ............ *C04B 18/12* (2013.01); *C04B 20/023* (2013.01); *C04B 20/0232* (2025.05); *C04B 28/04* (2013.01); *C04B 28/105* (2013.01); *C02F 2001/007* (2013.01); *C02F 1/66* (2013.01); *C02F 11/127* (2013.01); *C02F 11/145* (2019.01); *C02F 2103/10* (2013.01)

(58) Field of Classification Search
CPC ......... C04B 20/0232; B03D 3/02; C02F 9/00; C02F 1/66; C02F 11/127; C02F 11/145; C02F 11/147; C02F 2001/007; C02F 2103/10; C02F 11/121; C02F 11/143; B01D 17/0217; B01D 21/01; Y02W 30/91
See application file for complete search history.

(56) References Cited

U.S. PATENT DOCUMENTS

| | | | | |
|---|---|---|---|---|
| 11,639,303 | B2 * | 5/2023 | Trifkovic | C02F 1/5245 210/725 |
| 11,912,593 | B2 * | 2/2024 | Trifkovic | C02F 11/143 |
| 2009/0075046 | A1 * | 3/2009 | Fox | C09D 175/04 428/319.3 |
| 2010/0104744 | A1 | 4/2010 | Moffett | |
| 2013/0019780 | A1 | 1/2013 | Karimi et al. | |
| 2013/0206702 | A1 | 8/2013 | Lin et al. | |
| 2014/0007795 | A1 | 1/2014 | Moffett et al. | |
| 2015/0041370 | A1 | 2/2015 | Lin et al. | |
| 2016/0272525 | A1 | 9/2016 | Moffett | |
| 2018/0362371 | A1 | 12/2018 | Favero et al. | |
| 2020/0002197 | A1 * | 1/2020 | Trifkovic | C02F 11/148 |
| 2023/0219831 | A1 | 7/2023 | Trifkovic et al. | |
| 2024/0254019 | A1 | 8/2024 | Trifkovic et al. | |
| 2026/0035297 | A1 | 2/2026 | Pandey et al. | |

FOREIGN PATENT DOCUMENTS

| | | | | |
|---|---|---|---|---|
| CA | 2772053 | A1 * | 9/2012 | B01D 29/03 |
| CA | 2823459 | A1 | 2/2015 | |
| CA | 2912898 | A1 | 10/2016 | |
| CA | 3047562 | A1 * | 12/2019 | C02F 11/143 |
| CN | 103318995 | A | 9/2013 | |
| WO | 2010056539 | A1 | 5/2010 | |
| WO | 2012075399 | A2 | 6/2012 | |
| WO | 2012088291 | A1 | 6/2012 | |
| WO | 2013096787 | A1 | 6/2013 | |
| WO | 2014153431 | A1 | 9/2014 | |
| WO | 2018141067 | A1 | 8/2018 | |

OTHER PUBLICATIONS

Alomair, Osamah A, et al., "Nanofluids Application for Heavy Oil Recovery", Society of Petroleum Engineers (SPE), Presented at SPE Asia Pacific Oil & Gas Conference and Exhibition, Adelaide, Australia, Oct. 14-16, 2014, Oct. 14, 2014.

Andreola, Fernanda , et al., "Release of Ions from Kaolinite Dispersed in Deflocculant Solutions", Applied Clay Science 36 (2007) 271-278, Nov. 14, 2006.

Azam, Shahid , "Effect of Composition and Morphology on Self-Weight Settling of Laterite Ore Slurries", Geotech Geol. Eng. (2012) 30:107-118, Sep. 22, 2011.

BCG Engineering, Inc. , "Oil Sands Tailings Technology Review", Oil Sands Research and Information Network, University of Alberta, School of Energy and the Environment, Edmonton, Alberta, Canada. OSRIN Report No. TR-1. 136 pp., 2010.

Chalaturnyk, Richard J, et al., "Managment of Oil Sands Tailings", Petroleum Science and Technology, 20:9-10, 1025-1046; https://doi.org/10.1081/LFT-120003695, Dec. 2, 2001.

De Kretser, Ross , et al., "Improving Clay-Based Tailings Disposal: Case Study on Coal Tailings", AlChE Journal, vol. 43, No. 7, 1997, 1894-1903.

Devenny, David W, "A Screening Study of Oil Sand Tailings Technologies and Practices", Prepared for Alberta Energy Research Institute (AERI) Contract 2008 0326, Revision I, Mar. 2010, 2010.

Emady, Heather , et al., "Colloidal Microstructure Effects on Particle Sedimentation in Yield Stress Fluids", Journal of Rheology 57, Oct. 10, 2013, 1761-1772.

Farkish, Aida , et al., "Rapid Dewatering of Oil Sand Mature Fine Tailings Using Super Absorbent Polymer (SAP)", Minerals Engineering 50-51 (2013) 38-47, Jul. 4, 2013.

Gumfekar, Sarang P, et al., "Advanced Polymer Flocculants for Solid-Liquid Separation in Oil Sands Tailings", Macromol. Rapid Commun. 2018, 1800644, 2018.

Kasperski, Kim L, "A Review of Properties and Treatment of Oil Sands Tailings", AOSTRA Journal of Research, 8 (1992) 11, Dec. 3, 1992.

Kinnunen, Paivi H-M, et al., "Towards Circular Economy in Mining: Opportunities and Bottlenecks for Tailings Valorization", Journal of Cleaner Production 228 (2019) 153-160, Apr. 16, 2019.

Kotlyar, L. S., et al., "Characterization of Colloidal Solids from Athabasca Fine Tails", Clays and Clay Minerals, vol. 41, No. 3, 1993, 341-345.

Kotlyar, L. S, et al., "The Role of Biwetted Colloidal Solids in Structure Formation in Oil Sands Fine Tails", Fuel Science and Technology International, 12:6, 923-935, Mar. 23, 2007.

Krekeler, Mark P.S., et al., "Mineralogical and Geochemical Investigation of Clay-Rich Mine Tailings from a Closed Phosphate Mine, Bartow Florida, USA", Environ. Geol. (2008) 55:123-147, Oct. 11, 2007.

Li, Yuan , "Fundamental Study of the Sedimentation of Copper Tailings with Kynch Theory", Thesis, University of British Columbia, Vancouver, 2015.

Ma, Kunsong , et al., "Effect of Interaction Between Clay Particles and Fe3+ Ions on Colloidal Properties of Kaolinite Suspensions", Clays and Clay Minerals, vol. 45, No. 5, 733-744, 1997.

Majid, Abdul , et al., "Role of Hydrophobic Solids in the Stability of Oil Sands Fine Tailings", Fuel 1996 vol. 75 No. 7, Nov. 10, 1995, 879-884.

Mercier, P.H. J, et al., "Colloidal Clay Gelation: Relevance to Current Oil Sands Operations", Petroleum Science and Technology, 30:9, 915-923, Mar. 19, 2012.

Merkak, Othmane , et al., "Migration and Sedimentation of Spherical Particles in a Yield Stress Fluid Flowing in a Horizontal Cylindrical Pipe", AlChE Journal, vol. 55, No. 10, Jul. 28, 2009, 2515-2525.

Nusri, Saeed , et al., "Using Surface Geopolymerization Reactions to Strengthen Athabasca Oil Sands Mature Fine Tailings", Can. J. Chem. Eng. vol. 94, Issue 9, Jun. 1, 2016.

Nusri, Saeed El Khair, "Using Surface Geopolymerization Reactions to Strengthen Athabasca Oil Sands Mature Fine Tailings", University of Alberta, Department of Chemical and Materials Engineering, Thesis, 2015.

Orland, Kevin , "Oilsands Ponds Full of 340 Billion Gallons of Toxic Sludge Spur Fears of Environmental Catastrophe", https://financialpost.com/commodities/energy/340-billion-gallons-of-sludge-spur-environmental-fears-in-canada, Jan. 16, 2018.

Ovarlez, Guillaume , et al., "Shear-Induced Sedimentation in Yield Stress Fluids", Journal of Non-Newtonian Fluid Mechanics, Nov. 1, 2018.

Proskin, S. , et al., "Oil Sands MFT Properties and Freeze-Thaw Effects", J. Cold. Reg. Eng., vol. 26, No. 2, May 15, 2012.

(56) References Cited

OTHER PUBLICATIONS

Ripmeester, John A, et al., "2H NMR and the Sol-Gel Transition in Suspensions of Colloidal Clays", Colloids and Surfaces A: Physicochemical and Engineering Aspects, 78 (1993) 57-63, Mar. 8, 1993.
Roussel, Nicolas , "Steady State Flow of Cement Suspensions: A Micromechanical State of the Art", Cement and Concrete Research 40, Aug. 28, 2009, 77-84.
Scott, J. Don, et al., "Behaviour of the Clay/Bitumen/Water Sludge System from Oil Sands Extraction Plants", Applied Clay Science, 1 (1985), 207-218, Mar. 11, 1985.
Snabre, Patrick , et al., "Size Segregation in a Fluid-Like or Gel-Like Suspension Settling under Gravity or in a Centrifuge", Langmuir 2008, 24, Nov. 6, 2008, 13338-13347.
Sobkowicz, John , et al., "Oil Sands Tailings Technology Deployment Roadmaps, Project Report to Alberta Innovates, vol. 1", Jun. 29, 2012.
Sobkowicz, John , et al., "Oil Sands Tailings Technology Deployment Roadmaps, Project Report to Alberta Innovates, vol. 2", Jun. 22, 2012.
Stephens, Brett , et al., "Oil Sands Tailings Technology Deployment Roadmaps, Project Report to Alberta Innovates, vol. 3", Jun. 28, 2012.
Sun, Xiaofei , et al., "Application of Nanoparticles in Enhanced Oil Recovery: A Critical Review of Recent Progress", Energies 2017, 10, 345, Mar. 11, 2017.
Sworska, A. , et al., "iFlocculation of the Syncrude Fine Talings: Part I. Effect of pH, Polymer Dosage and Mg2+ and Ca2+ Cations", Int. J. Miner. Process. 60 (2000) 143-152, Apr. 6, 2000.
Trappe, Veronique , et al., "Colloidal Gels—Low-Density Disordered Solid-Like States", Current Opinion in Colloid and Interface Science 8, 2004, 494-500.
Vedoy, Diogenes R, et al., "Water-Soluble Polymers for Oil Sands Tailing Treatment: A Review", Can. J. Chem. Eng. 93:888-904, 2015, Mar. 19, 2015.
Wang, Chen , et al., "Current State of Fine Mineral Tailings Treatment: A Critical Review on Theory and Practice", Minerals Engineering 58 (2014) 113-131, Feb. 14, 2014.
Wislesky, Irwin , et al., "Oil Sands Tailings Technology Deployment Roadmaps, Project Report to Alberta Innovates, vol. 4", Jun. 29, 2012.

* cited by examiner

PROCESS FOR TAILINGS STREAM SEDIMENTATION AND SEGREGATION

CROSS-REFERENCE TO RELATED APPLICATIONS

This application claims the benefit of U.S. Provisional Patent Application Ser. No. 63/128,639, filed Dec. 21, 2020, the content of which is incorporated herein by reference in its entirety.

BACKGROUND OF THE INVENTION

Field of the Invention (Technical Field)

The present invention relates to the field of mineral processing or mineral separation, in particular separation, sedimentation, and segregation of polydisperse-sized solid minerals from water present in waste tailings streams (e.g. mining, mineral, oil, coal, or industrial waste tailings streams, sometimes referred to herein as "mining" or "mined" or "mine"). Embodiments of the present invention also relate to nanoclay compositions and methods, specifically nanoclays extracted from oil sands.

Background

Mining operations around the world are environmentally disruptive. A huge amount of slurry waste from mined minerals is generated once valuable minerals are extracted and processed from mined ore. The slurry waste is commonly deposited in tailings ponds. Large numbers of tailings are produced every day around the world because of the increase in global demand for raw materials. In Chile, for example, approximately 1.6 million tons of tailings are produced every day from mining operations. In Canada, mining of bitumen from oil sands has resulted in 340 billion gallons of contaminated wastewater in the form of tailings. Therefore, the management of tailings is a significant issue within the mining industry worldwide.

A major challenge with tailings ponds is the destabilization and consolidation of the mineral particles present in the slurry to release the trapped water. For example, the mature fine tailings (MFT) slurry from oil sands comprises fine clay minerals which are responsible for the water holding capacity of the tailings. Typically, an MFT comprises a stable colloidal suspension with a gel-like consistency made up of fine silt, clay, bitumen, and a very small amount of sand. This gel-like consistency is responsible for the poor dewatering characteristics of the MFT. Water is released on top of the tailings and this process of solid liquid separation is called sedimentation as the particles in the tailings settle. Once sedimentation is completed, a consolidation process starts that leads to further increases in the solids content of the sediment and improvement in the sediment strength. An understanding of the sedimentation of tailings can provide a solid foundation for management and reclamation of tailing ponds.

Sedimentation of solid particles in liquid materials is caused by gravitational force which pulls down high-density particles. Sedimentation is generally classified into four types: (1) discrete particle settling, (2) flocculent settling, (3) hindered settling, and (4) compression settling. In discrete particle settling, the particles settle individually without interaction with one another. Discrete particle settling usually occurs with low solid concentrations and larger particles. In flocculent settling, particles form flocculants or "flocs" by sticking together and settling at a faster speed. Flocculent settling is normally achieved using a polymeric flocculant. Under hindered settling, there is significant interaction between particles and individual particle settling cannot take place. The whole suspension settles as a blanket and there is an upward flow of water movement through the spaces between particles. Finally, compression settling takes place when particles are in contact with each other at very high concentrations and water is squeezed out of the matrix resulting in an adjustment in the solid fraction within the matrix. In most of the mine tailings slurries, the particle concentration is high enough (small particle-particle distance) to cause significant attraction between particles so that hindered settling takes place. Therefore, in such slurries the sedimentation velocity is considerably lower than the terminal velocity of individual particles under free settling condition. This results in a slower settling rate in tailings slurries.

Fine clay mineral particles are universally present in most mine tailings. The surface interaction between clay particles affects the dewatering characteristics of mine tailings. The anisotropic clay minerals have a complex surface chemistry where the basal faces carry a pH-independent negative charge and the edges carry a pH-dependent charge. Clay particles can interact to form edge-edge (EE), edge-face (EF) and face-face (FF) aggregate structures based on the charge heterogeneities between clay faces and edges. For example, the clay minerals in tailings slurry have been typically described to possess an EF association of particles, resulting in a card house configuration that develops a 3D network of particles during the settling process.

This 3D network or mesh of clay particles prevents free particle settling or segregation. Settling occurs as a single unit or blanket while allowing upward flow of water and results in hindered settling. Sedimentation can thus be prevented by a 3D network of particles with sufficient yield strength.

Suspensions with a yield stress behave as a solid until a minimum threshold stress is applied to make them flow. The yield stress of the fluid may offset the sedimentation and segregation unless exceeded by its shear stress. An example of this excessive shear stress is shear stress within a mineral pipeline. A suspension with yield stress can be classified as a glass suspension, wherein high-solid loadings cause particles to crowd each other and impart elasticity to the fluids. A suspension with a yield stress can also be classified as a gel suspension, wherein strong interparticle interactions between particles form a space-filling network with sufficient elasticity. Clays fall under the colloidal glass suspensions and can impart significant yield stress to the fluids to prevent sedimentation. Therefore, it is possible to trap larger particles in a space-filling network of interacting particles with sufficient yield stress. For example, the yield stress in cement slurry is desirable to avoid sedimentation and segregation of coarse elements present in the concrete.

Another example is the extremely slow rate of settling in mature fine tailings in the bitumen mining process due to the presence of highly charged, ultrafine clay minerals (<300 nm) that form a gel-like structure. These ultrafine clay particles are responsible for forming a stable dispersion of gel-like solids with a high water-holding capacity. Coarse solids and bitumen are embedded within the dispersion. Although these ultrafine clay particles account for a small fraction of the MFT solids, they alone are responsible for the slow dewatering and colloidal stability of MFT solids. The resulting clay water suspension can take decades to settle out and poses a huge environmental liability.

Industrial utilization of nano sized materials has grown in the past decade. Nanomaterials possess unique properties because of their high surface area and nanoscale size and may be incorporated into products to provide enhanced performance using less raw material. The energy and construction sectors in particular have capitalized on the use of nanomaterials in several applications including drilling fluids, nanofluids for enhanced oil recovery, and as a reinforcing material in cement and asphalt binders. The waste tailings material produced by the mining industry is a significant source of nanomaterials. Recycling waste tailings material by extracting nanomaterials can contribute to the sustainability of the mining sector and reduce penalties imposed on waste producers. For instance, the extraction of bitumen from mineable oil sands deposits in northern Alberta, Canada, produces a wet waste stream of tailings. The tailings slurry is comprised primarily of sand, fines (silt and clay), and ultrafine clay particles (<300 nm). Reprocessing these tailings to extract nanoclay ("NC") can be a cost-effective method approach in comparison to processing of virgin materials. Furthermore, the extraction of nanoclays will help mining companies to transform existing tailings into thriving habitats while having an opportunity to use the mine waste as a valuable material.

The mature fine tailings ("MFTs") generated during oil sands mining is a complex mixture of clay minerals, silt, and sand along with several other valuable minerals such as titanium. The ultrafine fraction of the MFT, i.e., clay particles with size ranges of between 0.02 μm to 0.3 μm, exhibit high surface area, clay activity, and are responsible for the high water-holding capacity of the MFT. The high water-holding capacity is because the ultrafine fraction forms a gel network that entraps the solids present in the MFT. Moreover, a sizeable fraction of the ultrafine fraction exhibits bi-wettable behaviour due to the presence of strongly bounded organic material. The ultrafine fraction particles in MFTs may be a source of nanoclays that can then be used as additives for cement, asphalt binders, preparing polymer nanocomposites, as emulsion and foam stabilizers, and/or nanofluid for enhanced oil recovery.

Clays are widely used in the modification of polymer matrices to improve the mechanical, thermal and barrier properties. The organic treatment of clays renders hydrophilic clays hydrophobic, thus improving their interaction with a wide spectrum of polymer matrices, which are hydrophobic in nature. The most common organic treatment of clays is done using an alkyl ammonium compound with variety of chain lengths and a primary, secondary, tertiary, or quaternary amine. The organic treatment allows dispersion of NCs into polymer matrices via a melt intercalation process to form polymer nanocomposites with enhanced properties. Their bi-wettable nature has been exploited for compatibilization of polymer blends by selective localization of NCs at their interface. Significant improvement in mechanical properties can be achieved by localizing low loadings of NCs at the interface of polymer blends with droplet and co-continuous morphology. Melt processing is an industrially preferred method of introducing nanoclays into polymer matrices because it is a solventless process, cost effective, and simple to implement at large scale.

One such example of a NC-modified polymer composites is a polyamide-6 clay nanocomposite used to replace a metal component near vehicle engine blocks to reduce weight. The clay in this automotive application improved the heat distortion temperature of the material. In addition, polymer functionalization with polar groups is often employed to enhance interaction between polymers and nanoclays. The examples of improvement of morphological, rheological, mechanical, thermal, and gas barrier characteristics of the nanocomposites have been reported for various polymer matrices. The other examples include polymer-clay nanocomposites for flame retardant and gas barrier applications.

NCs have also been explored as a low-cost alternative to polymers for preparing modified asphalt binders and can either be introduced into the hot asphalt mix or used in asphalt emulsions to make a nanomodified asphalt binder. NC modification has been reported to enhance mechanical properties such as creep and fatigue resistance. Montmorillonite modified asphalts have been shown to have higher viscoelastic properties and rutting resistance. Clay-stabilized asphalt emulsions are already a known technology for non-paving applications. Asphalt emulsified with clay provides an alternative route to preparing clay-modified asphalt composites for low energy road building and maintenance applications.

NC particles have also been used for enhancing the mechanical performance, resistance to chloride penetration, and reduction and permeability of concrete. For example, the organo-modified montmorillonites ("OMMT") have been employed in cement mortars. Addition of nano-montmorillonite in cement paste has increased cement paste compressive strength by 12.24% and reduced the permeability coefficient by 49.95%. The addition of the nano-clay particles also simulates the pozzolanic reaction where silicates and water react with calcium hydroxide to form a Calcium-Silicate-Hydrate bond ("C-S-H"). Oil well cement slurry with nano-bentonite has also exhibited higher compressive and tensile strength.

NCs have been used as emulsifier. One use has been to improve the recovery of heavy oil with polyacrylamide. Additionally, $CO_2$ foams prepared with nanoclay exhibit excellent stability and foamability. For example, sodium-montmorillonite stabilized Pickering emulsions possessing high viscosities and elasticities at high salinities have potential uses a conformance control agent in reservoirs. Montmorillonite-stabilized emulsions exist at a wide range of pH (3.3-11) and salinity (0%-20% NaCl). NC has also been used as a superior fluid loss control additive for drilling muds.

The increased demand for NCs has led to decreased supply. While product property improvements with introduction of NCs have been demonstrated, their cost is the limiting factor to capitalizing on their potential in various applications. What is needed is a method to extract large quantities of NCs for use in applications incorporating NCs.

BRIEF SUMMARY OF THE INVENTION

The present invention relates to a method for destabilizing tailings, the method comprising: contacting the tailings with a deflocculant, wherein the tailings comprise a clay; adjusting a pH level of the tailings; adsorbing the deflocculant onto the clay; and segregating the tailings into a plurality of layers. In another embodiment, at least one of the plurality of layers comprises layers having a greater density disposed below layers having a lesser density. In another embodiment, at least one of the plurality of layers comprises a bitumen layer. In another embodiment, the plurality of layers comprises ultrafines. In another embodiment, the deflocculant comprises an inorganic deflocculant. In another embodiment, the deflocculant comprises an inorganic deflocculant. In another embodiment, adsorbing the deflocculant onto the clay creates an electrostatic repulsive force. In another embodiment, adsorbing the deflocculant onto the clay creates an electro-steric repulsive force. In another embodiment, the method further comprises contacting the tailings with an alkali. In another embodiment, the pH is adjusted to a range of about pH 7 to about pH 10. In another embodiment, the method further comprises dewatering the tailings. In another embodiment, the method further comprises extracting a nanoclay from the tailings. In another embodiment, extracting a nanoclay from the tailings comprises contacting the tailings with a reagent. In another embodiment, the concentration of the deflocculant is in the range of about 1000 ppm to about 9000 ppm.

The present invention also relates to a method for dewatering ultrafines comprising: contacting the ultrafines with a cation, wherein the cation has a pH value less than about 7; and contacting the ultrafines with a filter to dewater the ultrafines. In another embodiment, the cation is derived from a benzyl trimethyl ammonium cation. In another embodiment, contacting the ultrafines with a cation coagulates the ultrafines.

The present invention also relates to a nanoclay cement composition comprising: a nanoclay extracted from a tailing and cement. In another embodiment, the cement comprises Portland cement. In another embodiment, the cement comprises magnesium oxide cement.

The present invention relates to the sedimentation and segregation of the tailings mixture by reducing the yield stress of the mineral slurry using an inorganic or organic deflocculant/dispersant.

The present invention also relates to the methods and compositions using oil sands extracted NCs for a variety of purposes including, but not limited to, construction materials, enhanced oil recovery, polymers, nanofluids, stabilizers for emulsions and foams, and drilling fluids. The method comprises extracting nanoclays from hydrocarbon and non-hydrocarbon sources. Hydrocarbons may comprise mature fine tailings, thin fine tailing, extraction tailings, whole tailings, or a combination thereof. Non-hydrocarbons may comprise phosphates and coal. In one embodiment the nanoclays are extracted using a reagent. In another embodiment the nanoclays are extracted using mechanical separation. In one embodiment the tailings comprise mature fine tailings and/or oil sands. In another embodiment, the nanoclays are extracted from clay ultrafines. The nanoclays may comprise surface modifications. NC compositions may comprise nanoclays extracted from tailings and a material.

The NCs extracted from tailings may be used in industrial applications including, but not limited to, as a cement, asphalt, and/or additive, or for enhanced oil and/or hydrocarbon recovery, emulsions, foams, nanofluids, polymer nanocomposites or a combination thereof.

In one embodiment, processes are disclosed for the treatment of a tailing's mixture from oil sands, e.g., mature fine tailings with a solid content greater than about 30%. The MFT is a mixture of sand, fine silt, clay particles and bitumen with a pH ranging from about 7 to about 8.5. Upon addition of a deflocculant/dispersant to the MFT mixture, sedimentation and segregation of solids takes place. The bottom sediment consists of sand, silt, and clay minerals with a solids content of about >60% one week after deflocculation. The released water preferably comprises ultrafine clay minerals ("ultrafines") (about 5-7% by wt.) one week after the treatment. The sedimentation of ultrafines is slower and happens gradually over time. The top layer of the tailing mixture comprises a fine layer of released bitumen.

In one embodiment, NCs extracted from tailings may be contacted with cement to form a nanoclay and cement composition. The nanoclay and cement composition may have increased compressive and flexural strength compared to a cement composition without nanoclays. The cement may comprise Portland or magnesium oxide-based cement. Depending on the NCs loadings, they can serve as an additive or cement replacement.

In one embodiment, nanoclays extracted from tailings may be used to form a nanoclay and cement composition ("NC cement"). The nanoclay and cement composition may have increased compressive and flexural strength compared to a cement composition without nanoclays. The cement may comprise Portland or magnesium oxide cement ("MGO cement" or "MCO"). The nanoclay may also partially replace Portland or magnesium oxide-based cement.

In another embodiment, nanoclays extracted from tailings may be contacted with an oil and water mixture to form a nanoclay-stabilized oil and water emulsion ("NC emulsion"). Nanoclays extracted from hydrocarbon tailings are contacted with a hydrophobic fluid to form an NC-stabilized foam ("NC foam"). The nanoclays extracted from hydrocarbon tailings may comprise surface modifications. The NC emulsion and NC foam may be used to recover hydrocarbons. The NC emulsion may be used to stabilize bitumen and/or asphalt for paving and non-paving applications. The NC-asphalt emulsions may improve viscoelastic properties and rutting resistance of asphalt binder. In another embodiment, nanoclays extracted from hydrocarbon tailings may be suspended in a fluid to form a nanofluid. The nanofluid may be used for enhanced oil and/or hydrocarbon recovery.

In another embodiment, nanoclays extracted from hydrocarbon tailings may be used to form an oil and water mixture to form a nanoclay-stabilized oil and water emulsion ("NC emulsion"). Nanoclays extracted from hydrocarbon tailings are used with a hydrophobic fluid to form an NC-stabilized foam ("NC foam"). The nanoclays extracted from hydrocarbon tailings may comprise surface modifications. The NC emulsion and NC foam may be used to recover hydrocarbons. The NC emulsion may be used to stabilize bitumen and/or asphalt for paving and non-paving applications. In another embodiment, nanoclays extracted from hydrocarbon tailings may be suspended in a fluid to form a nanofluid. The nanofluid may be used for enhanced oil and/or hydrocarbon recovery.

In another embodiment, nanoclays extracted from hydrocarbon tailings may be contacted with a polymer to form polymer nanocomposites. The nanoclays polymer nanocomposites may improve the mechanical, thermal, and barrier properties. The nanoclays extracted from hydrocarbon tailings may comprise surface modifications. In another embodiment, NCs extracted from hydrocarbon tailings can be used as polymer blend compatibilizers to refine polymer blend morphology and improve mechanical, flame retardant, air barrier properties. In another embodiment, nanoclays extracted from hydrocarbon tailings may be contacted with drilling and/or kill mud to form a nanoclay and drilling and/or kill mud composition ("NC drilling mud"). The NC drilling mud may comprise saline water. Nanoparticles for these applications are either too expensive to be deployed at large scale or would require extensive surface modification to change the surface properties. Nanoclays extracted from hydrocarbon tailings are less expensive and/or require less surface modification compared to nanoparticles.

In another embodiment, nanoclays extracted from hydrocarbon tailings may be used to form polymer nanocomposites. The nanoclays extracted from hydrocarbon tailings may comprise surface modifications. In another embodiment, nanoclays extracted from hydrocarbon tailings may be used with drilling and/or kill mud to form a nanoclay and drilling and/or kill mud composition ("NC drilling mud"). The NC drilling mud may comprise saline water.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims (if any).

BRIEF DESCRIPTION OF THE SEVERAL VIEWS OF THE DRAWINGS

The accompanying drawings in the attachment, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Figure 1:
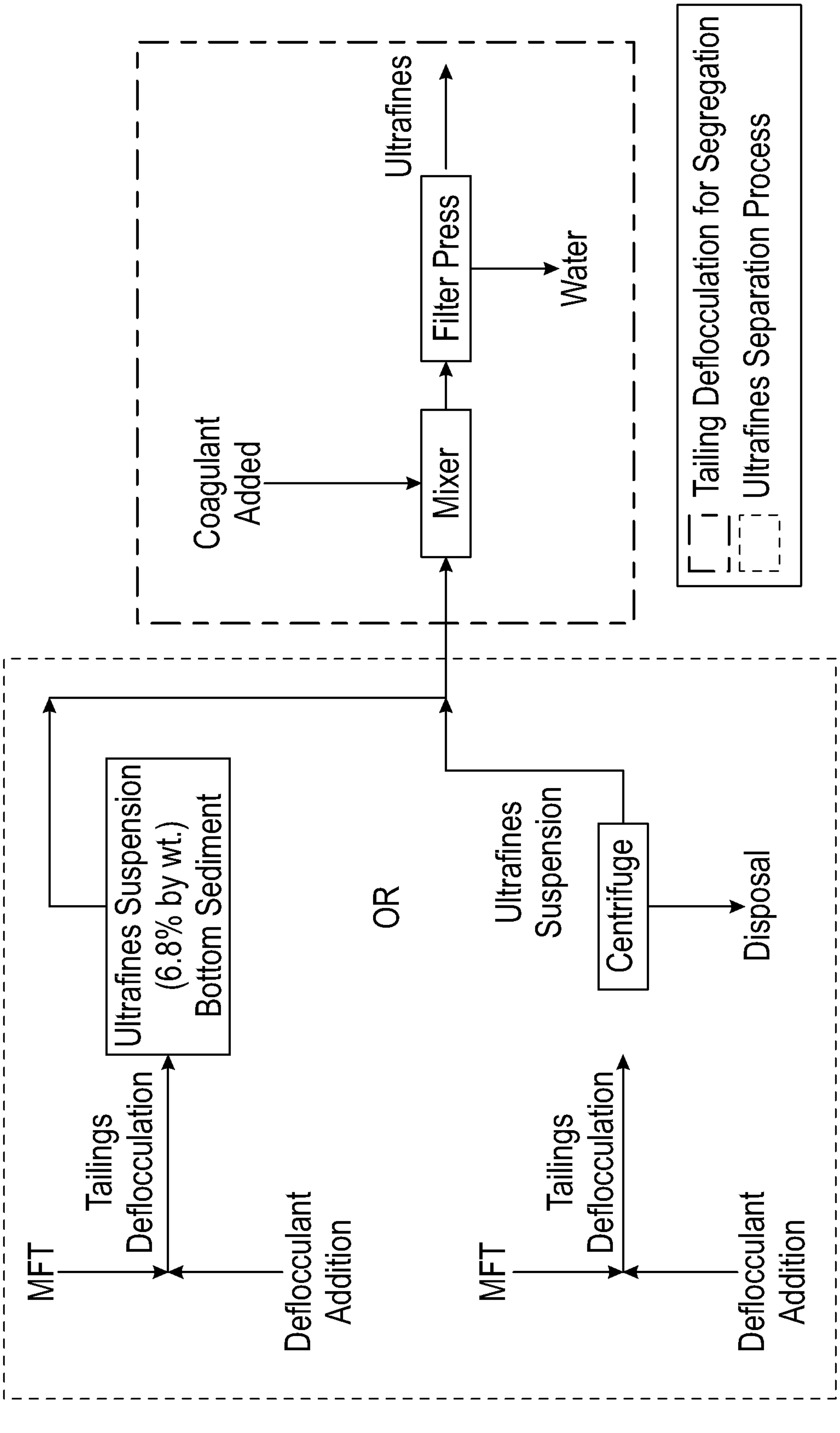
FIG. 1 is a process flow diagram showing alternate methods for the segregation and separation of ultrafine clay materials.

The present invention relates to a method using deflocculants to reduce the yield stress of the tailing mixtures, for example MFTs, to cause destabilization and sedimentation of the solids present in the tailing mixture as well as remove residual bitumen trapped within the tailing mixture. Methods are disclosed herein where tailings solids are sedimented and segregated based on the size, with coarser fractions settling at the bottom and ultrafine clay minerals remaining at the top of the segregated mixture. Residual bitumen liberated from the tailing mixture accumulates on top of the released water. The bottom sediment and ultrafines undergo consolidations as time progresses. Tailing mixtures are segregated by contacting a tailing mixture with a dispersant or deflocculant. Ultrafines or tailings are dewatered to increase solids concentration. Ultrafines or tailings are dewatered through contact with a cation. The cation may be an inorganic or organic cation. The cation may be derived from a hydroxide.

The present invention also relates to methods and compositions using oil sands extracted NCs for a variety of purposes including, but not limited to, construction materials, enhanced oil recovery, polymers, nanofluids, stabilizers for emulsions and foams, and drilling fluids. The method comprises extracting nanoclays from hydrocarbon and non-hydrocarbon tailings and contacting the nanoclays with a material. Hydrocarbons may comprise mature fine tailings, thin fine tailings, extraction tailings, whole tailings, or a combination thereof. Non-hydrocarbons may comprise phosphates and coal. The nanoclays extracted from tailings may be suspended in solution, dried, crushed, agglomerated, powdered or combination thereof. The nanoclays extracted from tailings may comprise a slurry, solution, homogenous mixture, heterogenous mixture, Newtonian fluid, non-Newtonian fluid, or a combination thereof. The nanoclays may be extracted using a reagent.

The terms "slurry" and "mixture" are defined to include, but not be limited to, mineral tailings from mining operations. Non-limiting examples of minerals tailing include mature fine tailings, thin fine tailings, and laterite tailings.

The terms "tailings" or "tailing" are defined to include, but not be limited to, residual material from mineral processing operations. The terms encompass all categories of tailings, including, but not limited to, mature fine tailings and thin fine tailings. Non-limiting examples of mineral processing operations include operations for oil, gas, coal, metal, sand, clay, and hard rock mining.

The terms "ultrafines" or "ultrafine" are defined to include, but not be limited to, clays separated from tailings.

In one embodiment the bottom sediment comprises a solids content of about 10%-15% by weight, about 15%-20% by weight, about 20%-25% by weight, about 25%-30% by weight, about 30%-35% by weight, about 35%-40% by weight, about 40%-45% by weight, about 45%-50% by weight, about 50%-55% by weight, about 55%-60% by weight, about 60%-65% by weight, about 65%-70% by weight, about 70%-75% by weight, about 75%-80% by weight, about 80%-85% by weight, about 85%-95% by weight, or about 95%-100% by weight.

In another embodiment the bottom sediment comprises a solids content of about 10%-30% by weight, about 30%-45% by weight, about 45%-60% by weight, about 60%-75% by weight, about 75%-90% by weight, or greater than about 90% by weight.

In another embodiment the bottom sediment comprises a solids content of about 10%-45% by weight, about 45%-60% by weight, about 60%-85% by weight, or greater than about 85% by weight.

In another embodiment the ultrafines comprise a solids content of about 1%-5% by weight, about 5%-10% by weight, 10%-15% by weight, about 15%-20% by weight, about 20%-25% by weight, about 25%-30% by weight, about 30%-35% by weight, about 35%-40% by weight, about 40%-45% by weight, about 45%-50% by weight, about 50%-55% by weight, about 55%-60% by weight, about 60%-65% by weight, about 65%-70% by weight, about 70%-75% by weight, about 75%-80% by weight, about 80%-85% by weight, about 85%-95% by weight, or about 95%-100% by weight.

In another embodiment the ultrafines comprise a solids content of about 1%-10% by weight, about 10%-30% by weight, about 30%-45% by weight, about 45%-60% by weight, about 60%-75% by weight, about 75%-90% by weight, or greater than about 90% by weight.

In another embodiment the ultrafines comprise a solids content of about 10%-45% by weight, about 45%-60% by weight, about 60%-85% by weight, or greater than about 85% by weight.

In another embodiment, the concentration of the deflocculant/dispersant is about 1000 ppm to about 1500 ppm, about 1500 ppm to about 2000 ppm, about 2000 ppm to about 2500 ppm, about 2500 ppm to about 3000 ppm, about 3000 ppm to about 3500 ppm, about 3500 ppm to about 4000 ppm, about 4000 ppm to about 4500 ppm, about 4500 ppm to about 5000 ppm, about 5000 ppm to about 5500 ppm, about 5500 ppm to about 6000 ppm, about 6000 ppm to about 6500 ppm, about 6500 ppm to about 7000 ppm, about 7000 ppm to about 7500 ppm, about 7500 ppm to about 8000 ppm, about 8000 ppm to about 8500 ppm, about 8500 ppm to about 9000 ppm, about 9000 ppm to about 9500 ppm, or about 9500 ppm to about 10000 ppm.

In another embodiment, the concentration of the deflocculant/dispersant is about 1000 ppm to about 2000 ppm, about 2000 ppm to about 3000 ppm, about 3000 ppm to about 4000 ppm, about 4000 ppm to about 5000 ppm, about 5000 ppm to about 6000 ppm, about 6000 ppm to about 7000 ppm, about 7000 ppm to about 8000 ppm, about 8000 ppm to about 9000 ppm, or about 9000 ppm to about 10000 ppm.

In another embodiment, the concentration of the deflocculant/dispersant is about 1000 ppm to about 3000 ppm, about 3000 ppm to about 5000 ppm, about 5000 ppm to about 7000 ppm, about 7000 ppm to about 9000 ppm, or greater than about 9000 ppm.

In another embodiment, the ultrafines are dewatered by about 5%-10%, about 10%-15%, about 15%-20%, about 20%-25%, about 25%-30%, about 30%-35%, about 35%-40%, about 40%-45%, about 45%-50%, about 50%-55%, about 55%-60%, about 60%-65%, about 65%-70%, about 70%-75%, about 75%-80%, about 80%-85%, about 85%-90%, about 90%-95%, or about 95%-100% relative to their initial water content.

In another embodiment, the ultrafines are dewatered by about 5%-15%, about 15%-25%, about 25%-35%, about 35%-45%, about 45%-55%, about 55%-65%, about 65%-75%, about 75%-85%, about 85%-95%, or greater than about 95% relative to their initial water content.

In another embodiment, the ultrafines are dewatered by about 5%-30%, about 30%-55%, about 55%-80%, or greater than about 85% relative to their initial water content.

In another embodiment, the size of the ultrafines is less than 300 nm. In another embodiment bottom sediment preferably comprises a solid content of about 70% or greater and an ultrafines sediment solid content of about 40% or greater within three months following deflocculant treatment and consolidation.

The deflocculating action of the reagents can either be via electrostatic repulsive force or through electro-steric repulsive forces. The dispersants modify the sedimentation behaviour by reducing the viscosity and the yield stress of the tailing slurry. For example, the deflocculating action of sodium silicate arises from condensation of silicate ions and precipitation on the surface of clays. Silicate ion precipitation on clay surfaces increases the negative charge on the clay surface and the deflocculating action to reduce the viscosity and yield stress of the mixture or slurry. Similarly, for sodium hexametaphosphate, the deflocculating action arises from the absorption of phosphate ion on clay surfaces. Sodium hexametaphosphate absorbs to clay surfaces by forming an inner sphere complex involving $Al^{3+}$ ions of the clay surface and oxygen from the exametaphosphate. Organic deflocculants such as polyacrylates deflocculate the mixture or slurry via adsorption of polymeric anions on the clay particles. Organic deflocculants reduce the interaction between particles responsible for formation of 3D structures with high yield stress.

The deflocculant/dispersants can either be inorganic or organic deflocculants. Non-limiting examples of inorganic deflocculants include sodium silicate, aqueous alkali alumino silicate, sodium hexametaphosphate, sodium carbonate, polyphosphates, oxalates or any combination thereof. Non-limiting examples of organic deflocculants include polyacrylates, acrylic derivatives, polycarbonates, or any combination thereof. In some embodiments, combinations of inorganic deflocculant and an alkali (NaOH, CaO, KOH) may be added to improve the deflocculant/dispersant action. In some embodiments a combination or inorganic and organic dispersants is also used.

The pH of the treated mixture or slurry ranges from about 7-10 depending on the pH of the deflocculant being used. MFTs treated with sodium silicate are at about pH 9 or greater. MFTs treated with sodium hexametaphosphate are at a pH of about 7-8. Organic deflocculants including, but not limited to, Darvan 811, Darvan 7, Dolapix PC 29, Dolapix PC 67, may also be used.

Another embodiment of the invention includes dilution of the MFT using process water to reduce the MFT solids content. MFT solids content is reduced by at least about 5-15% by weight to mimic thin fine tails (TFT). Diluted MFTs are deflocculated using organic and inorganic deflocculants to cause sedimentation and segregation of minerals.

Another embodiment of the invention includes a method for dewatering clay ultrafines comprising adding a cation with a basic or neutral pH to the clay ultrafines, and using a filter to remove water and retain the ultrafines. The cation is preferably benzyl trimethyl ammonium cation, which is preferably derived from benzyl trimethyl ammonium hydroxide.

Figure 14:
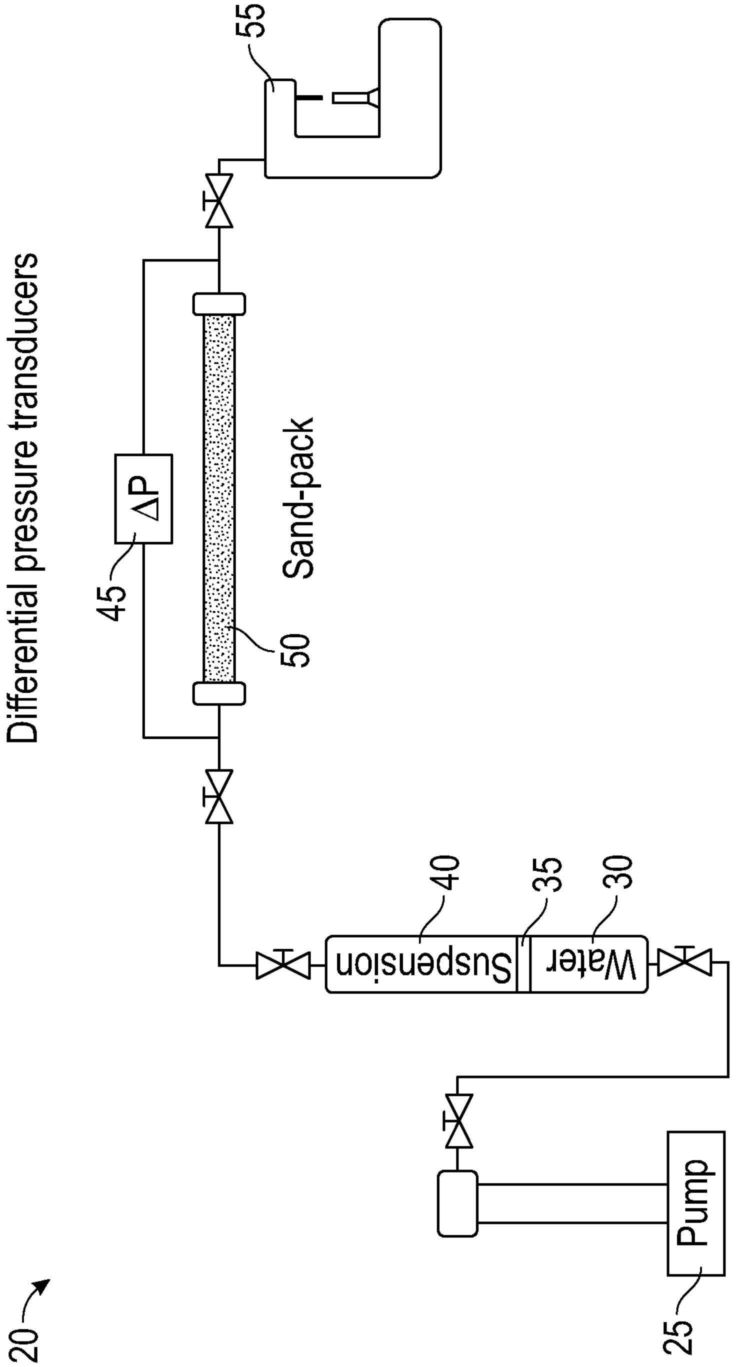
FIG. 14 is a diagram of a sand pack system used for an enhanced oil recovery test.

The benzyl trimethyl ammonium cation uses the ionic exchange capacity of clays, resulting in simultaneous particle size neutralization and coagulation and renders clays hydrophobic to achieve greater dewatering. FIG. 14 shows water recovery from ultrafine suspension with and without treatment with benzyl trimethyl ammonium cation. FIG. 14 shows that treatment with benzyl trimethyl ammonium cation is highly effective in dewatering ultrafine clay minerals.

Another embodiment of the invention includes a method for dewatering MFTs comprising adding an organic cation with a basic or neutral pH to MFTs. The cation is preferably tetra butyl ammonium hydroxide and tetra butyl phosphonium hydroxide. Optionally, the cation may be benzyl trimethyl ammonium hydroxide.

The reagent may comprise flocculant or coagulant that agglomerates the nanoclays and allows water and nanoclay separation. The reagent can be an anionic, cationic polymer, non-ionic or amphoteric such as polyacrylamide, polyethyleneimine, polydiallyldimethylammonium chloride, natural biopolymers such as chitosan, starch, guar gum, carboxymethyl cellulose etc., and inorganic salts of multivalent metals such as aluminium, iron. Salts of quaternary alkyl salts such as ammonium, phosphonium (example, benzyltrimethylammonium chloride, tetrabutylammonium chloride, tetrabutyl phosphonium chloride) that coagulates the clay and makes them hydrophobic can also be employed. Ionic liquids comprising such cation can also be used for coagulating and extracting nanoclays, Examples include trihexyltetradecylphosphonium chloride, n-octylammonium oleate, n-butylammonium acetate, etc. Reducing the pH of the nanoclays slurry for coagulations using acids or CO2 can also be employed for extraction.

The nanoclays may be extracted using mechanical separation. Mechanical separation may comprise centrifugation, decanting, filtration, pressure vacuuming, electrocoagulation, collecting a supernatant, or a combination thereof. The mechanical methods can be applied standalone or in combination with the reagents discussed above. The tailings comprise mature fine tailings, oil sands, fine tailings, crude oil deposits, or a combination thereof. The nanoclays may also be extracted from clay ultrafines.

NC compositions may comprise nanoclays extracted from tailings and a material. The material may comprise a construction material, a polymer, a fluid, or a combination thereof. The construction material may comprise concrete and/or asphalt. The polymer may comprise a polymer matrix and/or a nanocomposite. The fluid may comprise a hydrocarbon, an organic solvent, a surfactant, drilling fluid and/or kill mud, a hydrophobic fluid or solution, a saline fluid, an electrolytic solution, a bring, or a combination thereof.

The NCs extracted from tailings may be used in industrial applications including, but not limited to, cement, asphalt, steel, and/or additive, or for enhanced oil and/or hydrocarbon recovery, emulsions, foams, nanofluids, polymer nanocomposites or a combination thereof.

NCs extracted from tailings may be contacted with cement to form a nanoclay and cement composition ("NC cement composition"). The NC cement composition may have increased compressive and flexural strength compared to a cement composition without nanoclays. The NC cement composition may comprise Portland or MGO cement. The NC may also be used to partially replace cement.

NCs may comprise a concentration of at least about 0.1%, about 0.1% to about 0.5%, about 0.5% to about 1.0%, about 1.0% to about 1.5%, about 1.5% to about 2.0%, about 2.0% to about 2.5%, about 2.5% to about 3.0%, about 3.0% to about 3.5%, about 3.5% to about 4.0%, about 4.0% to about 4.5%, about 4.5% to about 5.0%, or about 5.0% by weight.

The NC cement composition may be resistant to high humidity conditions, including but not limited to, at least 75% RH, about 75% relative humidity ("RH") to about 80% RH, about 80% RH to about 85% RH, about 85% RH to about 90% RH, about 90% RH to about 95% RH, about 95% RH to about 100% RH, or about 100% RH.

The NC cement composition may be resistant to high humidity conditions, including but not limited to, at least 75% RH, about 75% RH to about 80% RH, about 80% RH to about 85% RH, about 85% RH to about 90% RH, about 90% RH to about 95% RH, about 95% RH to about 100% RH, or about 100% RH.

The NC cement composition may be cured. The curing may occur at a temperature of at least about 10° C., about 10° C. to about 11° C., about 11° C. to about 12° C., about 12° C. to about 13° C., about 13° C. to about 14° C., about 14° C. to about 15° C., about 15° C. to about 16° C., about 16° C. to about 17° C., about 17° C. to about 18° C., about 18° C. to about 19° C., about 19° C. to about 20° C., or about 20° C. The curing may also occur at an RH of at least about 10% RH, about 10% RH to about 15% RH, about 15% RH to about 20% RH, about 20% RH to about 25% RH, about 25% RH to about 30% RH, or about 30% RH.

The NC cement composition may have compressive strength compared to Portland cement without NCs. The NC cement composition may have greater flexural strength compared to Portland cement without NCs. The NC cement composition may exceed the compressive strength of Portland cement without NCs by at least about 4%, about 4% to about 6%, about 6% to about 8%, about 8% to about 10%, about 10% to about 12%, about 12% to about 14%, about 14% to about 16%, about 16% to about 18%, about 18% to about 20%, or about 20%. The NC cement composition may exceed the compressive strength of Portland cement without NCs by at least about 4%, about 4% to about 6%, about 6% to about 8%, about 8% to about 10%, about 10% to about 12%, about 12% to about 14%, about 14% to about 16%, about 16% to about 18%, about 18% to about 20%, or about 20%. The NC cement composition may exceed the flexural strength of Portland cement without NCs by at least about 5%, about 5% to about 10%, about 10% to about 15%, about 15% to about 20%, about 20% to about 25%, about 25% to about 30%, about 30% to about 35%, about 35% to about 40%, or about 40%. The NC cement composition may have an 38% greater compressive strength compared to MGO cement without NCs. The NC cement composition may have at least a 225% greater flexural strength compared to MGO cement without NCs. The NC cement composition may exceed the compressive strength of MGO cement without NCs by at least about 10%, about 10% to about 15%, about 15% to about 20%, about 20% to about 25%, about 25% to about 30%, about 30% to about 35%, about 35% to about 40%, about 40% to about 45%, about 45% to about 50%, about 50% to about 55%, about 55% to about 60%, or about 60%. The NC cement composition may exceed the flexural strength of MGO cement without NCs by at least about 100%, about 100% to about 125%, about 125% to about 150%, about 150% to about 175%, about 175% to about 200%, about 200% to about 225%, about 225% to about 250%, about 250% to about 275%, about 275% to about 300%, or about 300%.

Nanoclays extracted from hydrocarbon or other tailings may be contacted with an oil and water mixture to form a nanoclay-stabilized oil and water emulsion ("NC emulsion"). The NC emulsion may comprise NC at a concentration of at least about 0.1%, about 0.1% to about 0.2%, about 0.2% to about 0.4%, about 0.4% to about 0.6%, about 0.6% to about 0.8%, about 0.8% to about 1.0%, about 1.0% to about 1.2%, about 1.2% to about 1.4%, about 1.4% to about 1.6%, about 1.6% to about 1.8%, about 1.8% to about 2.0%, about 2.0% to about 2.2%, about 2.2% to about 2.4%, about 2.4% to about 2.6%, about 2.6% to about 2.8%, about 2.8% to about 3.0%, about 3.0% to about 3.2%, about 3.2% to about 3.4%, about 3.4% to about 3.6%, about 3.6% to about 3.8%, about 3.8% to about 4.0%, about 4.0% to about 4.2%, about 4.2% to about 4.4%, about 4.4% to about 4.6%, about 4.6% to about 4.8%, about 4.8% to about 5.0%, or about 5.0% by weight. The oil may comprise paraffin oil, dodecane, fats, organic oils, hydrophobic organic solvents, plant oils including but not limited to olive oil, palm oil, rapeseed oil, and hemp oil, liquid volatile hydrocarbons including but limited to methane, ethane, propane and butane, and oils derived from minerals including but not limited to bitumen and crude oil or a combination thereof.

The NC emulsion may comprise an oil to water ratio of at least about 2:10, about 2:10 to about 2:9, about 2:9 to about 2:8, about 2:8 to about 2:7, about 2:7 to about 2:6, about 2:6 to about 2:5, about 2:5 to about 2:4, about 2:4 to about 2:3, about 2:3 to about 2:2, about 2:2 to about 2:1, or about 2:1. The NC emulsion may be used to recover hydrocarbons. The NC emulsion may comprise a pH of at least about 3, about 3 to about 4, about 4 to about 5, about 5 to about 6, about 6 to about 7, about 7 to about 8, about 8 to about 9, about 9 to about 10, about 10 to about 11, or about 11. The NC emulsion may comprise a salinity of at least 0%, 0% to about 5%, about 5% to about 10%, about 10% to about 15%, about 15% to about 20%, or about 20% NaCl by weight. Nanoclays extracted from hydrocarbon or other tailings may be contacted with a spinodally decomposing fluid to arrest bicontinous interfacially jammed emulsion gels (bijels).

Nanoclays extracted from tailings may be contacted with a hydrophobic fluid to form an NC-stabilized foam ("NC foam"). The NC foam may comprise NC at a concentration of at least about 0.1%, about 0.1% to about 0.2%, about 0.2% to about 0.4%, about 0.4% to about 0.6%, about 0.6% to about 0.8%, about 0.8% to about 1.0%, about 1.0% to about 1.2%, about 1.2% to about 1.4%, about 1.4% to about 1.6%, about 1.6% to about 1.8%, about 1.8% to about 2.0%, about 2.0% to about 2.2%, about 2.2% to about 2.4%, about 2.4% to about 2.6%, about 2.6% to about 2.8%, about 2.8% to about 3.0%, about 3.0% to about 3.2%, about 3.2% to about 3.4%, about 3.4% to about 3.6%, about 3.6% to about 3.8%, about 3.8% to about 4.0%, about 4.0% to about 4.2%, about 4.2% to about 4.4%, about 4.4% to about 4.6%, about 4.6% to about 4.8%, about 4.8% to about 5.0% or about 5.0% by weight.

The hydrophobic fluid may comprise a surfactant. The surfactant may be anionic, cationic, non-ionic, or zwitterionic. The surfactant may comprise an alpha olefin sulfonate surfactant, a betaine such as cocamidopropyl betaine, an alkyl-ammonium such as cetrimonium bromide, or alkylphenol ethoxylates.

The hydrophobic fluid may comprise a concentration of at least about 0.1%, about 0.1% to about 0.2%, about 0.2% to about 0.3%, about 0.3% to about 0.4%, about 0.4% to about 0.5%, about 0.5% to about 0.6%, about 0.6% to about 0.7%, about 0.7% to about 0.8%, about 0.8% to about 0.9%, about 0.9% to about 1.0%, or about 1.0% by weight.

The NC foam may further comprise a salt solution. The solution may comprise a brine. The salt solution may comprise NaCl, KCl, $CaCl_2$, $MgCl_2$, or a combination thereof. The brine may comprise a salt concentration of at least about 1%, about 1% to about 5%, about 5% to about 10%, about 10% to about 15%, about 15% to about 20%, about 20% to about 25%, about 25% to about 30%, about 30% to about 35%, about 35% to about 40%, or about 40% by weight.

The NC foam may have increased foamability compared to foam without nanoclays. The NC foam may remain stable immediately after mixing and/or at least about 1 hour, about 1 hour to about 2 hours, about 2 hours to about 5 hours, about 5 hours to about 10 hours, about 10 hours to about 15 hours, about 15 hours to about 20 hours, about 20 hours to about 25 hours, about 25 hours to about 30 hours, or about 30 hours after preparation.

The NC foam may further comprise an oil. The oil may comprise a paraffin oil, dodecane, fat, organic oil, hydrophobic organic solvent, plant oil including but not limited to olive oil, palm oil, rapeseed oil, and hemp oil, liquid volatile hydrocarbon including but limited to methane, ethane, propane and butane, and oil derived from a mineral including but not limited to bitumen and crude oil or a combination thereof. The NC foam may comprise a gas, including, but not limited to, $N_2$, $CO_2$, natural gas, butane, steam, or a combination thereof.

The nanoclays extracted from tailings may comprise surface modifications. The surface modifications may comprise organo-modifications, or surface modifications to improve colloidal stability in high ionic strength fluids. The organo-modifications may comprise ammonium compounds, sulfanilic acid or a combination thereof. The ammonium compounds may comprise di(hydrogenated tallow) dimethylammonium chloride, dimethyl ditallow ammonium chloride, hexadecyl trimethyl ammonium bromide, octadecyltrimethylammonium, tetra-n-butylammonium bromide, hexadecyltributylphosphonium, tetrabutylphosphonium, butyltriphenylphosphonium.

The nanoclays extracted from tailings may be dispersed into a polymer. Dispersing the nanoclays extracted from tailings into the polymer may form a nanocomposite material. The polymer may comprise, polyolefins (e.g., polyethylene, polypropylene), polyamides, polystyrene, polyvinylchloride, acrylonitrile butadiene styrene, polymethylmethacrylate, polyphenylene sulfide (PPS), polyethylene terephthalate (PET), ethylene-vinyl acetate copolymer, polyacrylonitrile, polycarbonate, polyethylene oxide (PEO), epoxy resin, polyimide, polylactide, polycaprolactone, phenolic resin, poly p-phenylene vinylene, polypyrrole, rubber, polyurethane, and polyvinylpyridine. The polymer may comprise a reactive and nonreactive compatibilizer. The reactive compatibilizer may comprise maleic anhydride, glycidyl methacrylate, glycerol monostearate, or acrylic acid ionomer. Non reactive copolymer compatibilizers may include ethylene-ethylacrylate copolymer, ethylene-butylacrylate copolymer, ethylene methacrylate copolymer or styrenic block copolymer. The polymer nanocomposite may comprise a concentration of at least about 0.5% to about 10% by weight.

Nanoclays may also be employed in immiscible polymer blends as a solid compatibilizer and nanofiller. Nanoclays refine the droplet size of the dispersed minor phase, stabilise it against coalescence during melt mixing, and ensure strong interfacial adhesion between the phases, thereby improving the final mechanical properties. Depending on the extent of organomodification, nanoclays may also effectively pin the interface of polymer blends or create network within one of the phases to arrest the co-continuous morphology, which is particularly interesting because of their unique property of having two continuous phases. The co-continuous structures can also be achieved using spinodal decomposition of low molecular weight polymers or fluids arrested through nanoclays jammed at interface or networked within one of the phases for preserving the co-continuous morphology. The polymer blend nanocomposite may comprise a concentration of at least about 0.2% to about 4%, about 4% to about 6%, about 6% to about 8%, about 8% to about 10%, or about 10% by weight.

Organo-modified nanoclays extracted from tailings may be contacted with organic and inorganic pollutants to enable their successful removal from wastewaters.

Nanoclays extracted from tailings may be suspended in a fluid to form a nanofluid. The nanofluid may be used for enhanced oil and/or hydrocarbon recovery. The nanofluid may be contacted with oil and may enhance oil recovery. The nanofluid may enhance oil recovery by at least about 10%, about 10% to about 15%, about 15% to about 20%, about 20% to about 25%, about 25% to about 30%, about 30% to about 35%, about 35% to about 40%, about 40% to about 45%, about 45% to about 50%, or about 50% compared to recovery without the nanofluid.

Nanoclays extracted from hydrocarbon tailings may be contacted with drilling and/or kill mud to form a nanoclay and drilling and/or kill mud composition ("NC drilling mud"). The NC drilling mud may comprise NCs at a concentration of at least about 1.0%, about 1.0% to about 2.0%, about 2.0% to about 3.0%, about 3.0% to about 4.0%, about 4.0% to about 5.0%, about 5.0% to about 6.0%, about 6.0% to about 7.0%, about 7.0% to about 8.0%, about 8.0% to about 9.0%, about 9.0% to about 10.0%, or about 10% by weight. The NC drilling mud may also comprise NCs at a concentration of about 6.3% by weight.

The NC drilling mud may comprise a salt solution. The solution may comprise a brine. The salt solution may comprise NaCl, KCl, $CaCl_2$, $MgCl_2$ or a combination thereof. The brine may comprise a salt concentration of at least about 1%, about 1% to about 5%, about 5% to about 10%, about 10% to about 15%, about 15% to about 20%, about 20% to about 25%, about 25% to about 30%, about 30% to about 35%, about 35% to about 40%, or about 40% by weight. NC drilling mud may be free of settled material immediately after preparation or for at least about 6 hours, about 6 hours to about 12 hours, about 12 hours to about 18 hours, about 18 hours to about 24 hours, about 24 hours to about 30 hours, about 30 hours to about 36 hours, about 36 hours to about 42 hours, about 42 hours to about 48 hours, or about 48 hours after preparation. The NC drilling mud may comprise saline water. Nanoparticles for these applications are traditionally either too expensive to be deployed at large scale or would require extensive surface modification to change the surface properties. Nanoclays extracted from hydrocarbon tailings may be less expensive and/or require less surface modification compared to nanoparticles.

Tailings may be filtered to produce a sludge of ultrafines. Filtration may be performed about 10 psi, about 10 psi to about 50 psi, about 50 psi to about 100 psi, about 100 psi to about 500 psi, about 500 psi to about 1000 psi, or about 1000 psi. Optionally, the tailings may be $CO_2$ preconditioned to reduce the tailings' pH to about 6 to about 6.5. Preconditioning may comprise contact with $CO_2$. Ultrafines may be coagulated and/or dewatered by contacting the tailings with benzyltrimethyl ammonium chloride. The concentration of the benzyltrimethyl ammonium chloride may be about 1000 ppm to about 2000 ppm, about 2000 ppm to about 3000 ppm, about 3000 ppm to about 4000 ppm, about 4000 ppm to about 5000 ppm, about 5000 ppm to about 6000 ppm, about 6000 to about 7000 ppm, about 7000 ppm to about 8000 ppm, about 9000 ppm to about 10000 ppm, or about 10000 ppm. The tailings may also be coagulated and/or dewatered by centrifugation. Centrifugation may be performed at a gravity of at least about 25 g, about 25 g to about 100 g, about 100 g to about 300 g, about 300 g to about 500 g, about 500 g to about 700 g, about 700 g to about 900 g, about 900 g to about 1100 g, about 1100 g to about 1400 g, about 1400 g to about 2000 g, about 2000 g to about 5000 g, about 5000 g to about 10000 g, or about 10000 g. Centrifugation may be performed for at least about 1 min, about 1 min to about 5 min, about 5 min to about 50 min, about 50 min to about 500 min, about 500 min to about 5000 min, or about 5000 min.

Another aspect of the invention includes treatment of the laterite slurry with a polymeric dispersant to cause segregation and sedimentation of the mineral particles in the slurry.

Turning now to the figures, FIG. 1 is a process flow diagram showing alternate methods for the segregation and separation of ultrafine clay materials. Tailings may be contacted with a deflocculant, e.g., MFTs, to deflocculate the tailings. Deflocculated tailings may be either separated into layers by sedimentation, including and ultrafines suspension and bottom, or separate into fractions by a centrifuge. Ultrafines from the separated tailings may be contacted with an organic coagulant in a mixer. The ultrafines may be dewatered with a filter press.

Figure 2:
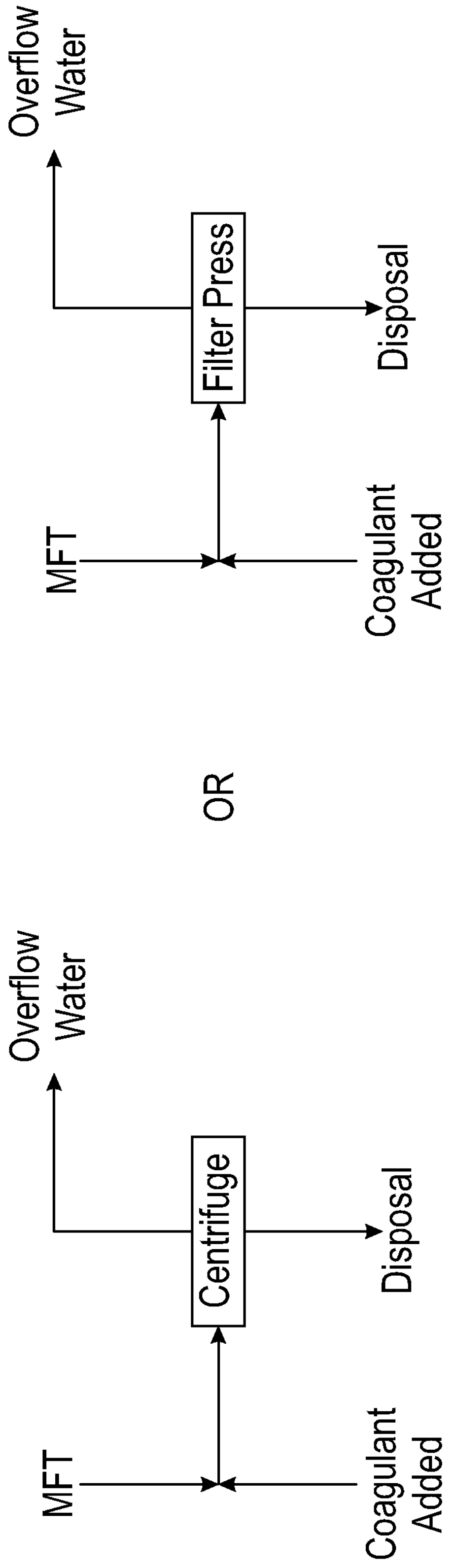
FIG. 2 is a process flow diagram showing alternate methods for the rapid dewatering of MFTs with coagulation.

FIG. 2 shows a process flow diagram showing alternate methods for the rapid dewatering of MFTs with coagulation. Tailings may be contacted with an organic coagulant and dewatered by a centrifuge. Alternatively, tailings may be contacted with an organic coagulant and dewatered with a filter press.

Figure 3A:
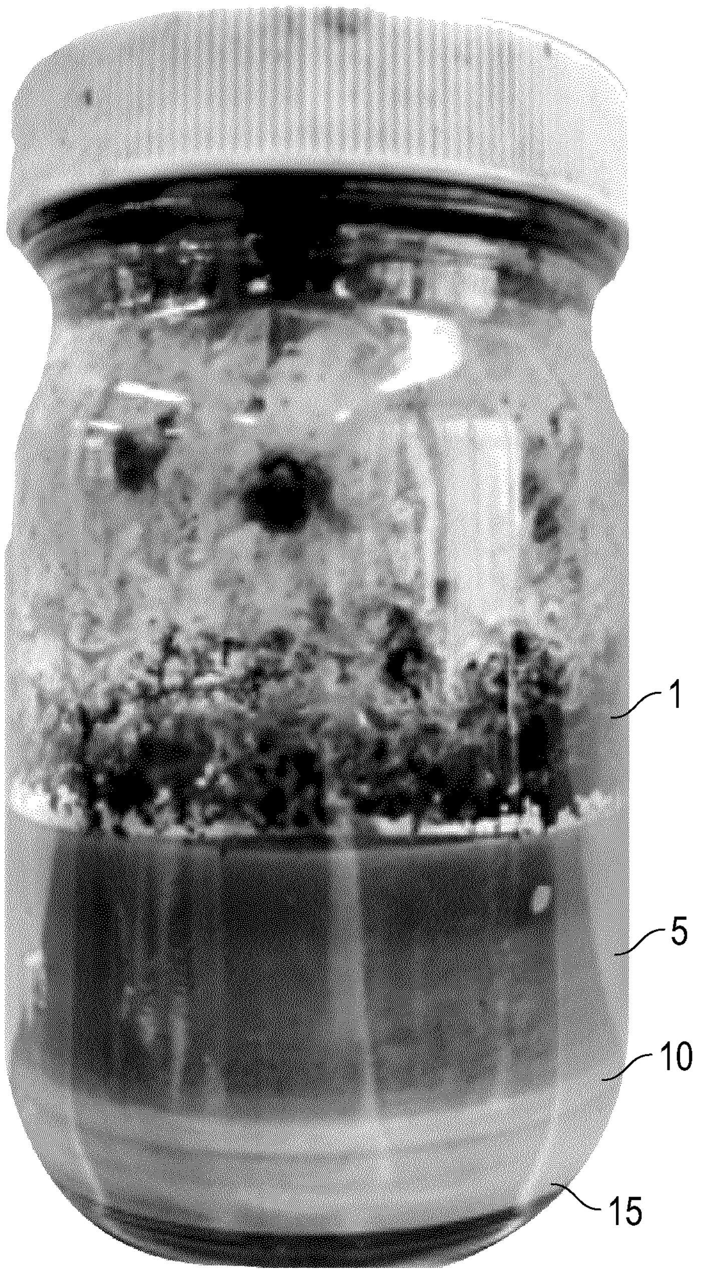
FIGS. 3A and 3B are a photo and a diagram showing a MFT treated with sodium silicate and CaO, showing solid sedimentation with the bottom sediment comprising sand, silt, and clay, and upper layers comprising released water with ultrafines.
Figure 3B:
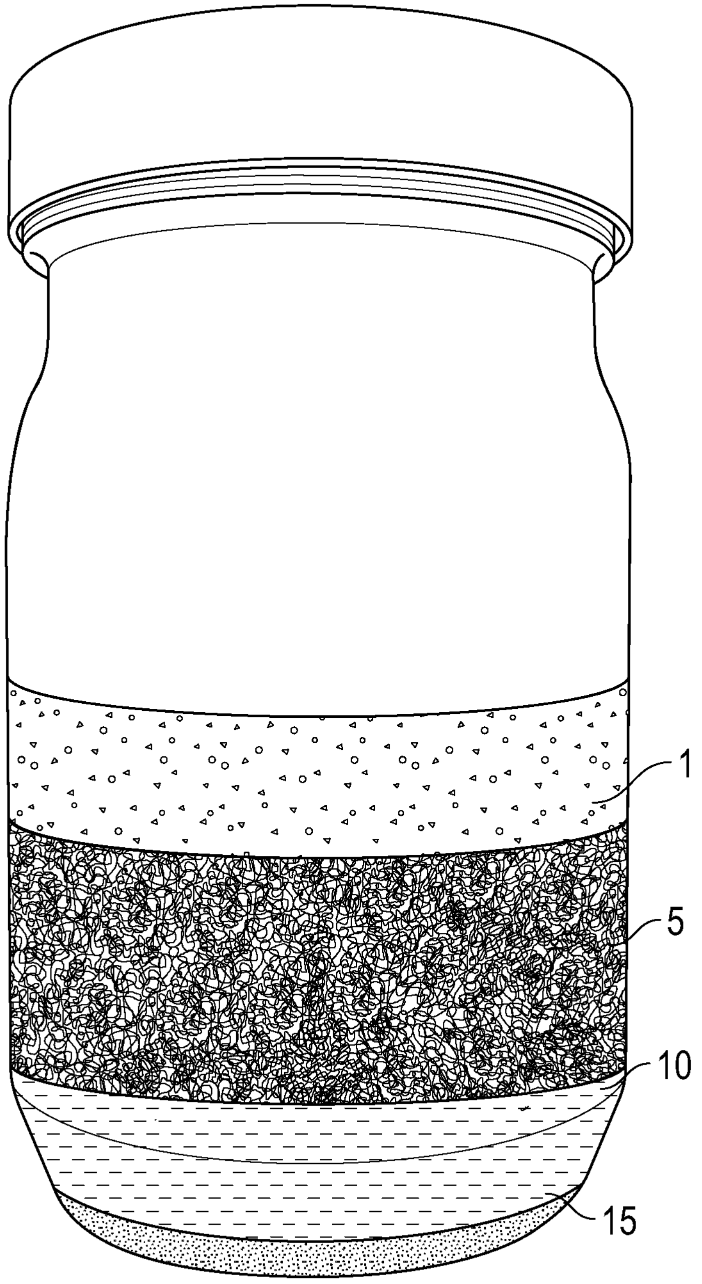

FIGS. 3A and 3B show MFT treated in accordance with the present invention and is representative of the results obtained. Destabilized ultrafines layer 10 rests below ultrafines layer 5. Bottom sediment 15 rests below destabilized ultrafines layer 10. The Examples and Figures herein show varying degrees of separation of layers 1, 5, 10, and 15 depending on the reagents, operating conditions, processing steps, and time. For example, this particular degree of separation resulted from the addition of sodium silicate and CaO, three weeks after treatment, showing solid sedimentation with the bottom sediment comprising sand, silt, and clay mineral over 300 nm in size and released water with an ultrafines concentration of 2% by weight. Bottom sediment 15 comprises mineral particles greater than 300 nm.

Figure 4:
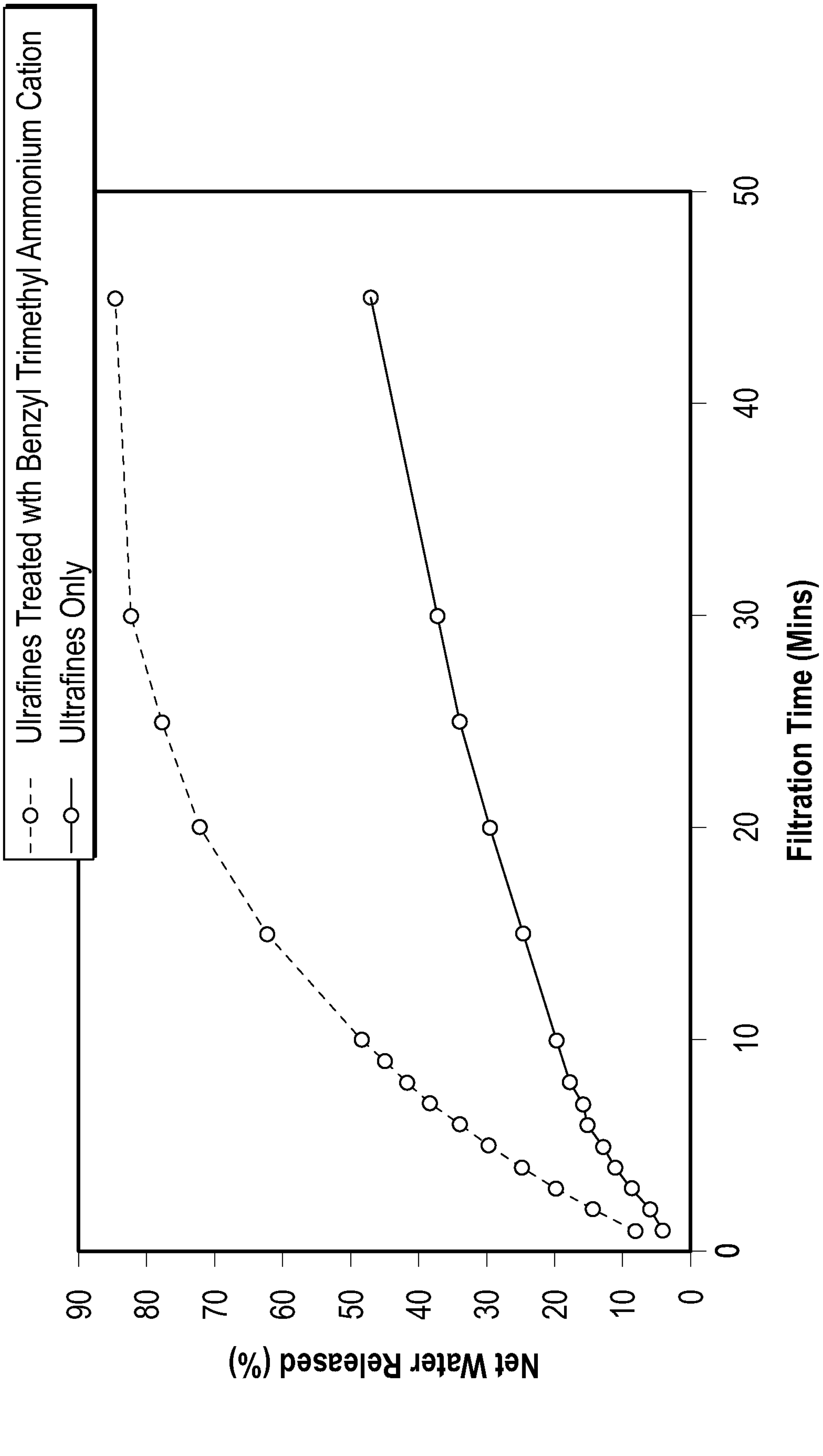
FIG. 4 is a graph of net water release using vacuum filtration with and without treatment with benzyl trimethyl ammonium cation.

FIG. 4 shows a graph of net water release using vacuum filtration with and without treatment with benzyl trimethyl ammonium cation. Treatment with benzyl trimethyl ammonium cation increases the percent of net water released compared to ultrafines without benzyl trimethyl ammonium cation treatment.

Figure 5:
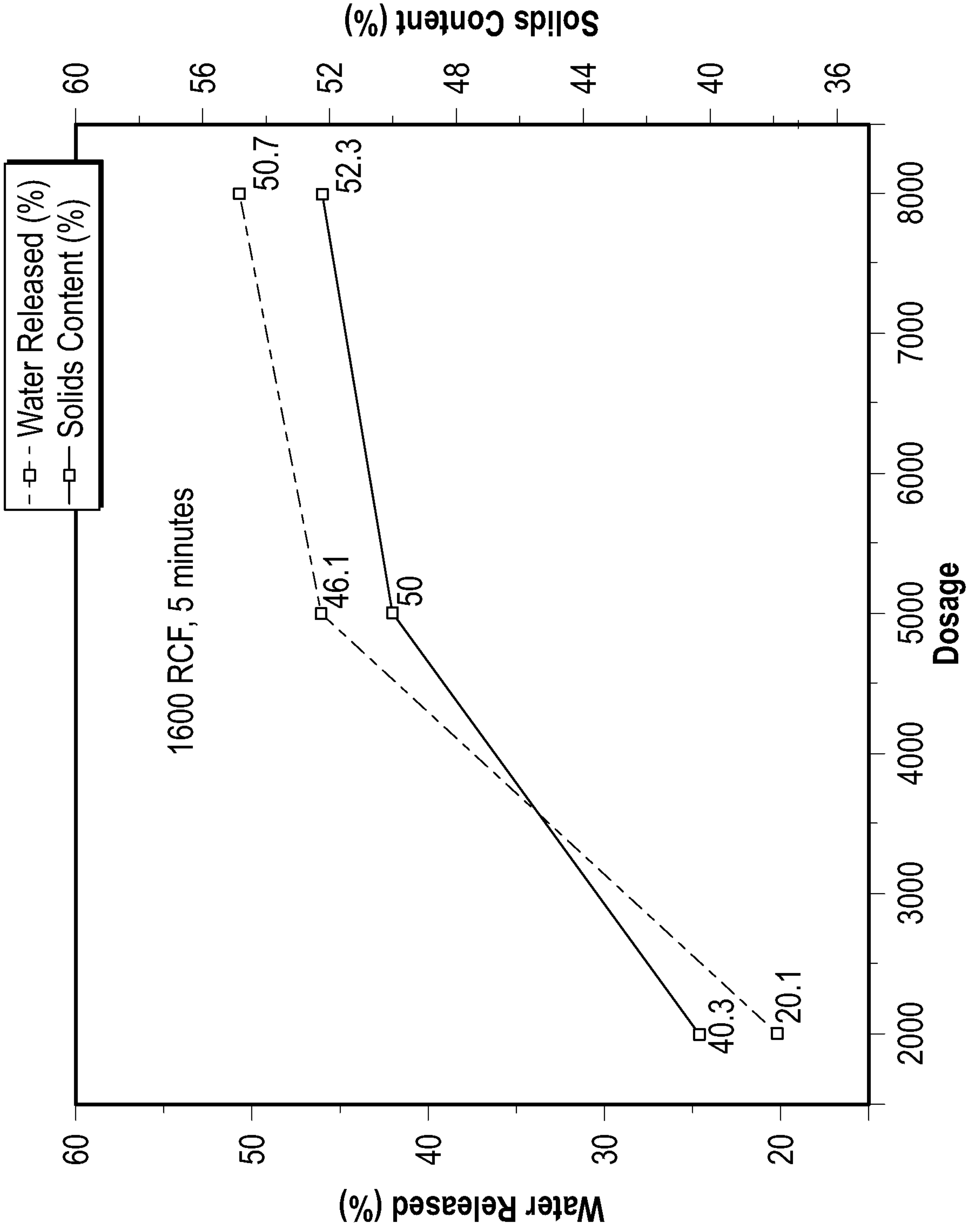
FIG. 5 is a graph of MFTs treated with different dosages of benzyl trimethyl ammonium hydroxide.

FIG. 5 shows a graph of MFTs treated with different dosages of benzyl trimethyl ammonium hydroxide.

Increased dosage of benzyl trimethyl ammonium hydroxide results in increased water release and solids content in MFTs.

Figure 6:
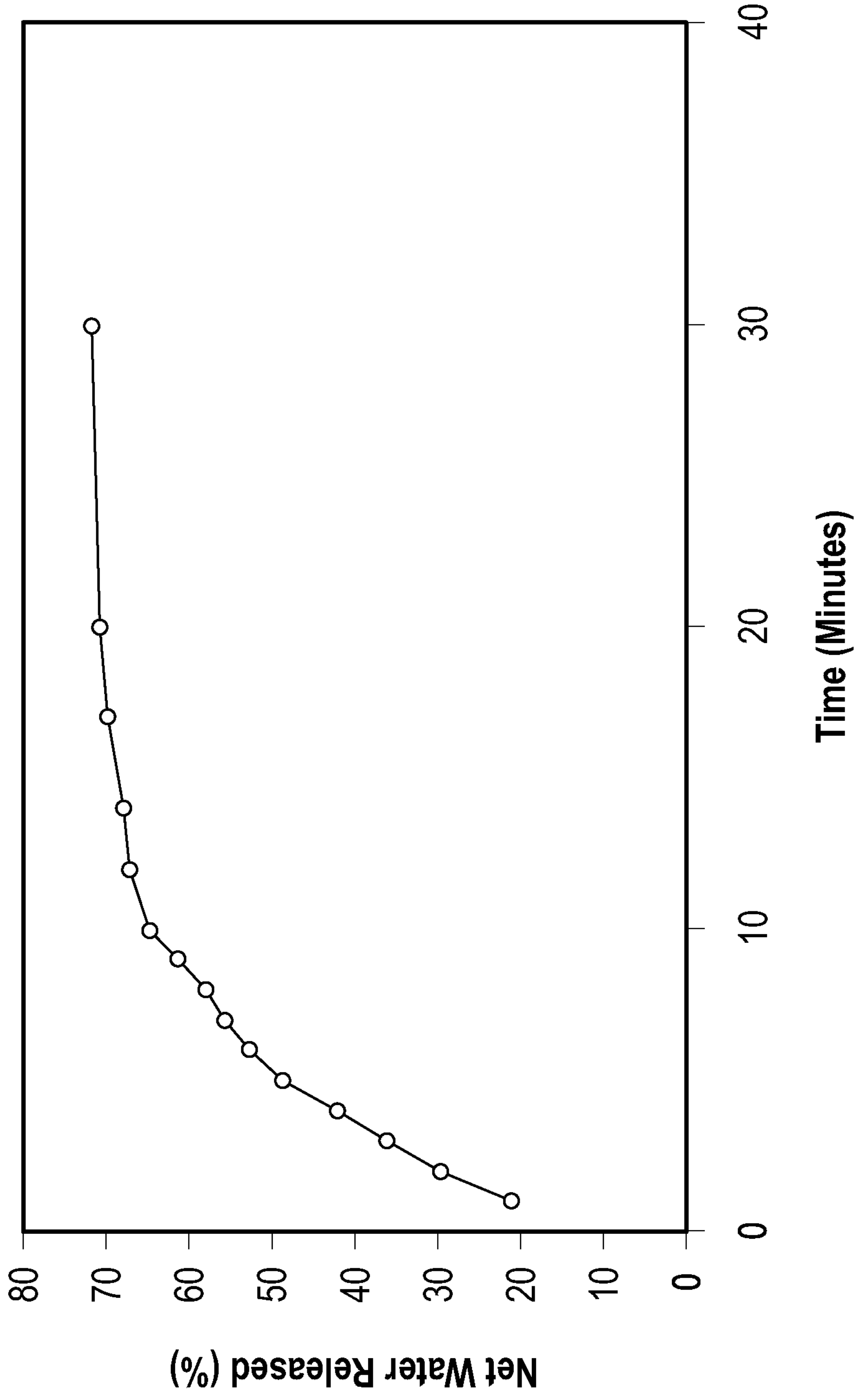
FIG. 6 is a graph of net water release using vacuum filtration without treatment with benzyl trimethyl ammonium cation.

FIG. 6 shows a graph of net water release using vacuum filtration without treatment with benzyl trimethyl ammonium cation. Approximately 70% net water release is achieved after 30 minutes with vacuum filtration.

Figure 7:
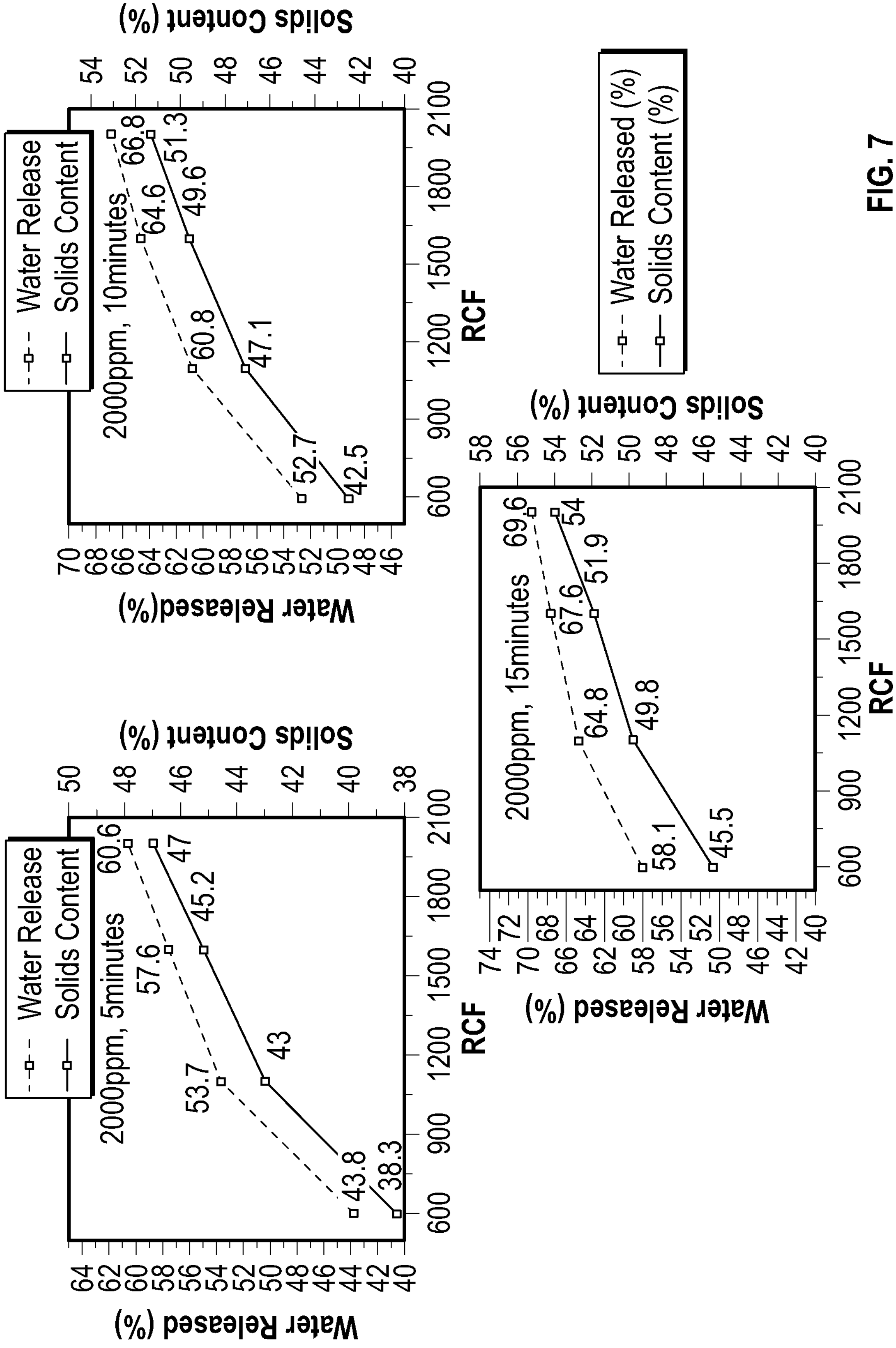
FIG. 7 are graphs showing the effect of centrifugal force and time on dewatering of benzyl trimethyl ammonium hydroxide treated MFT.

FIG. 7 shows the effect of centrifugal force and time on dewatering of benzyl trimethyl ammonium hydroxide treated MFT. Treatment of MFT with benzyl trimethyl ammonium hydroxide resulted in 60.6, 66.8, and 69.6 percent water release after 5 minutes, 10 minutes, and 15 minutes of centrifugation, respectively. Treatment of MFT with benzyl trimethyl ammonium hydroxide resulted in 47, 51.3, and 54 percent water release after 5 minutes, 10 minutes, and 15 minutes of centrifugation, respectively.

Figure 8:
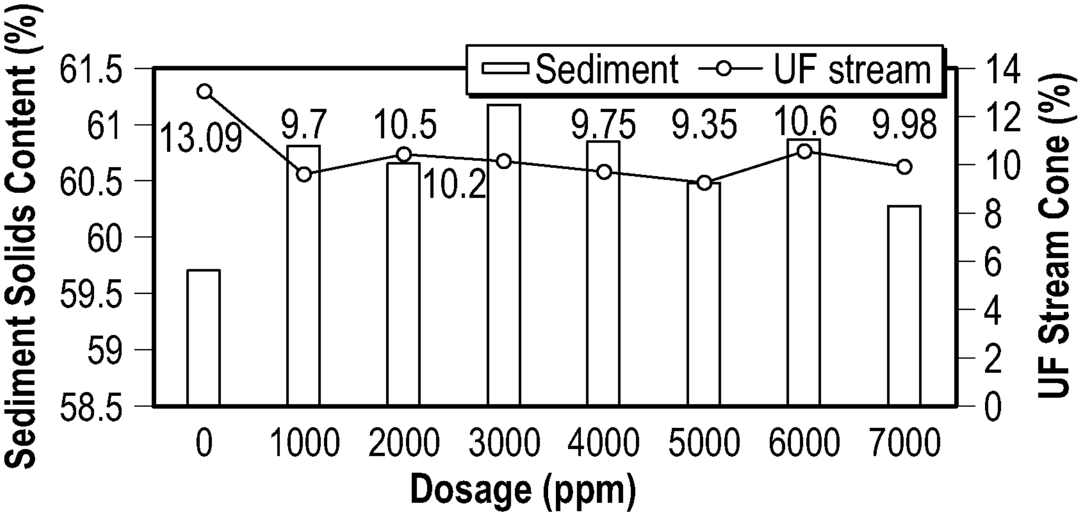
FIG. 8 shows the effect of sodium silicate on MFT sedimentation and segregation using a centrifuge at 1400 g for 5 minutes.

FIG. 8 shows the effect of sodium silicate on MFT sedimentation and segregation using a centrifuge at 1400 g for 5 minutes. Treatment of MFT with sodium silicate resulted in greater sediment solids content after centrifugation at 1400 g for 5 minutes.

Figure 9:
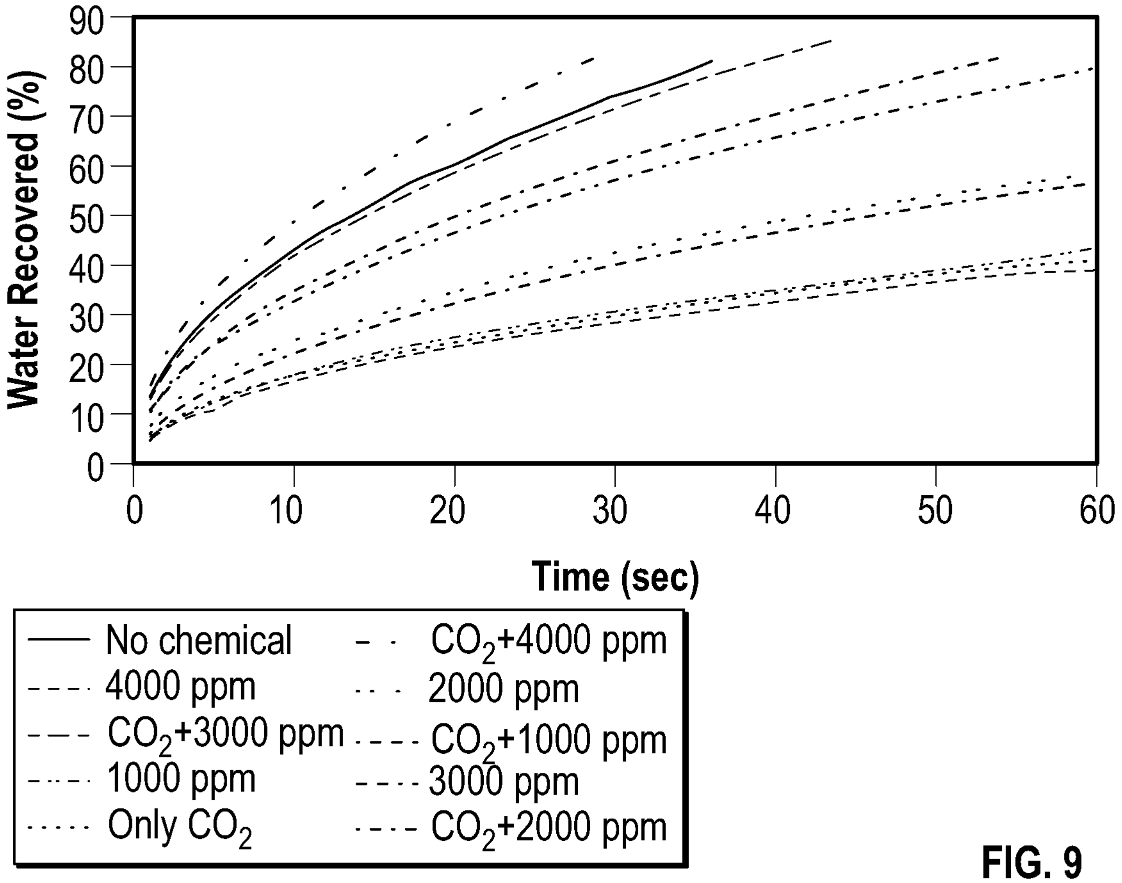
FIG. 9 is a graph showing the dewatering efficiency of benzyltrimethyl ammonium chloride on MFT with and without pretreatment with CO2.

FIG. 9 is a graph showing the dewatering efficiency of benzyltrimethyl ammonium chloride on MFT with and without pretreatment with CO2. Pretreatment with CO2 resulted in greater water recovery from MFT treated with benzyltrimethyl ammonium chloride compared to MFT not treated with benzyltrimethyl ammonium chloride.

Figure 10:
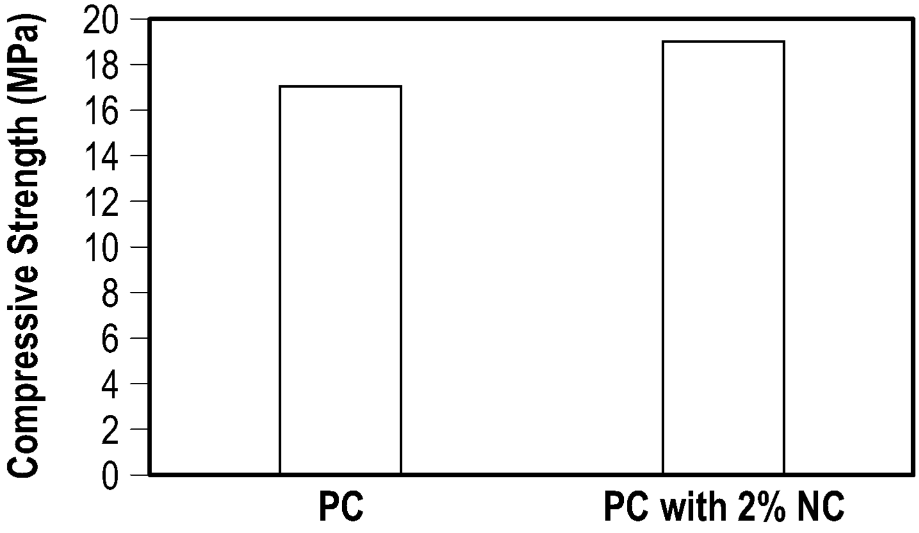
FIG. 10 is a graph showing the compressive strength for Portland cement vs. Portland cement with 2% by weight NC.

FIG. 10 is a graph showing the compressive strength for Portland cement vs. Portland cement with 2% by weight NC added in accordance with the present invention. Portland cement with 2% by weight NC has greater compressive strength compared to Portland cement without NC.

Figure 11:
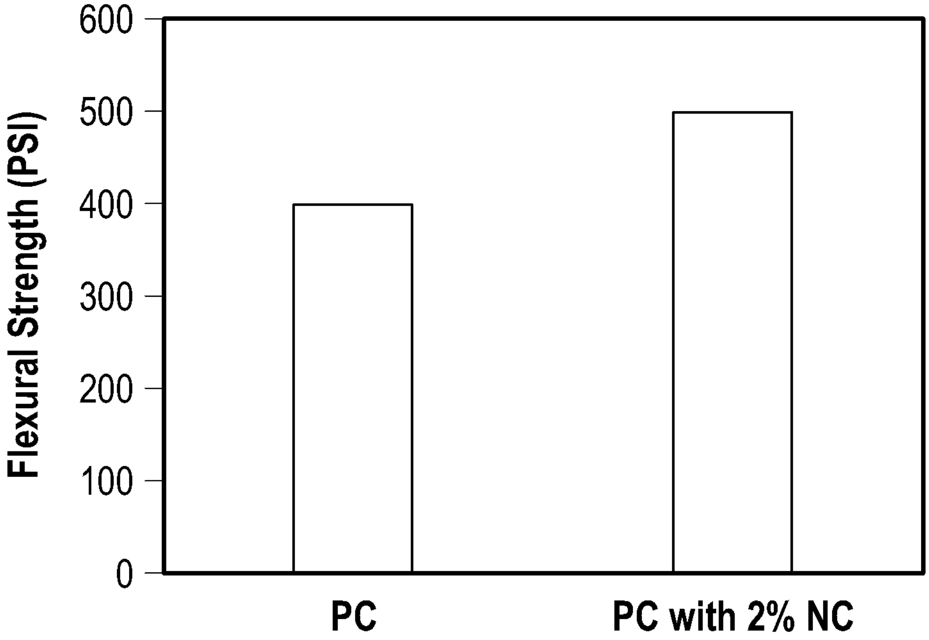
FIG. 11 is a graph showing the flexural strength for Portland cement vs. Portland cement with 2% by weight NC.

FIG. 11 is a graph showing the flexural strength for Portland cement vs. Portland cement with 2% by weight NC added in accordance with the present invention. Portland cement with 2% by weight NC has greater flexural strength compared to Portland cement without NC.

Figure 12:
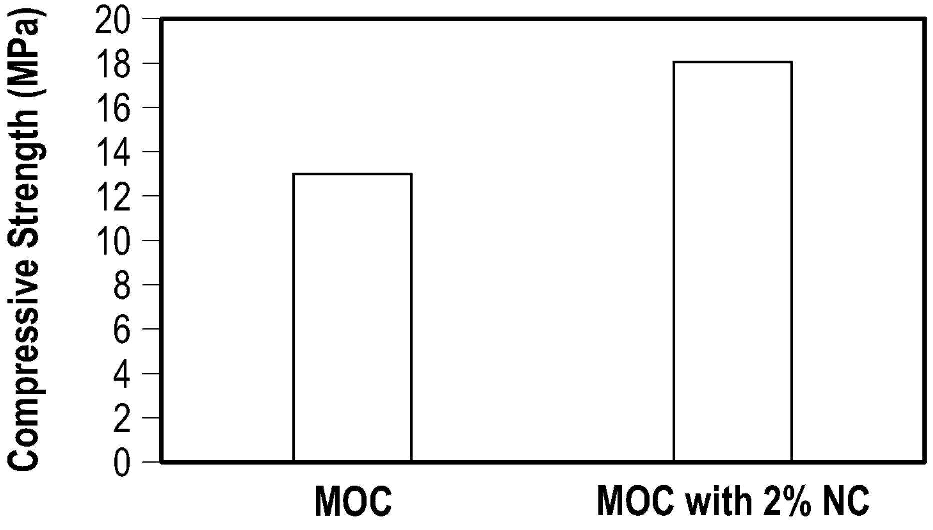
FIG. 12 is a graph showing the compressive strength for magnesium oxide cement ("MOC") vs. MOC with 2% by weight NC.

FIG. 12 is a graph showing the compressive strength for magnesium oxide cement ("MOC") vs. MOC with 2% by weight NC. MOC with 2% by weight NC had greater compressive strength compared to MOC without NC.

Figure 13:
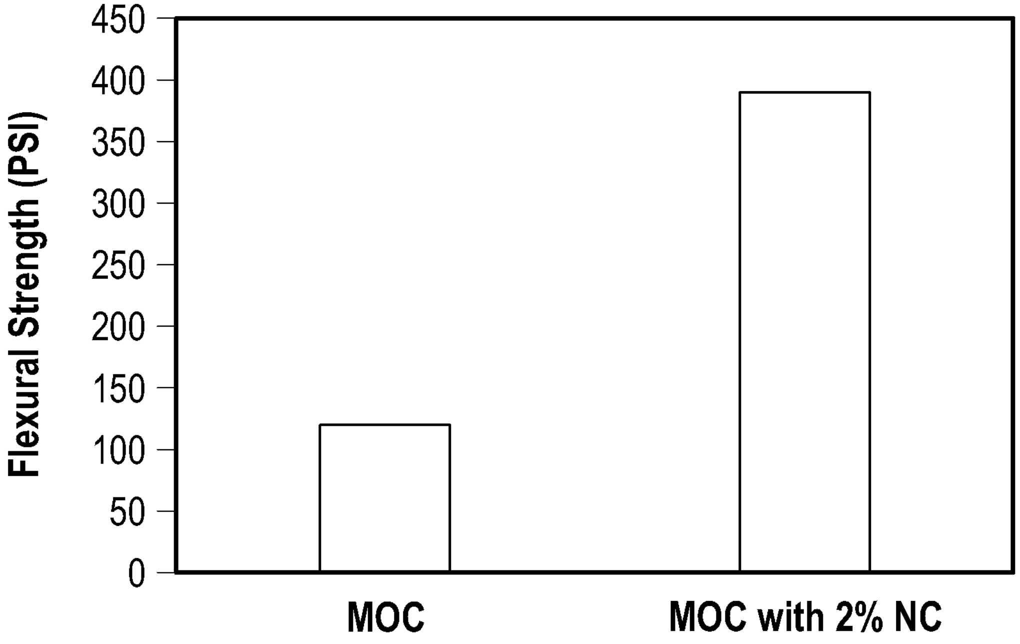
FIG. 13 is a graph showing the flexural strength for MOC vs. MOC with 2% by weight NC.

FIG. 13 is a graph showing the flexural strength for MOC vs. MOC with 2% by weight NC. MOC with 2% by weight NC had greater flexural strength compared to MOC without NC.

FIG. 14 is a diagram of a sand pack system used for enhanced oil recovery system 20. Pump 25 flows water 30 through permeable barrier 35 in to nanofluid 40. Nanofluid 40 is flowed into sand pack 50. Sand pack 50 contains trapped oil. Differential pressure transducer 45 measures fluid pressure entering and existing sand pack 50. Nanofluid and oil is collected at fraction collector 55.

Figure 15:
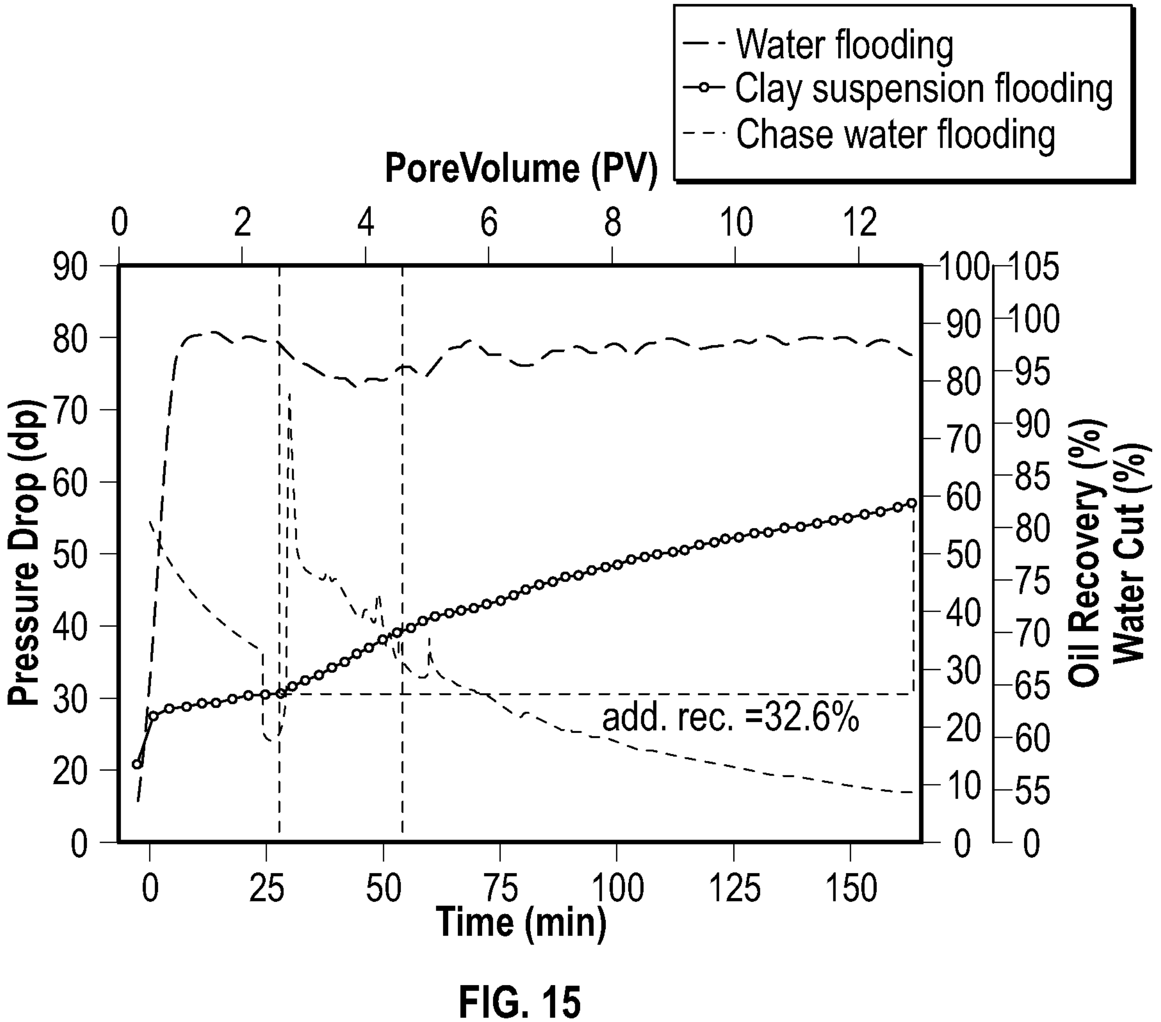
FIG. 15 is a graph showing oil recovery, water cut percentage, and pressure drop vs. pore injected and time.

FIG. 15 is a graph showing oil recovery, water cut percentage, and pressure drop vs. pore injected and time. Approximately 90% oil recovery is achieved after 150 minutes.

Figure 16:
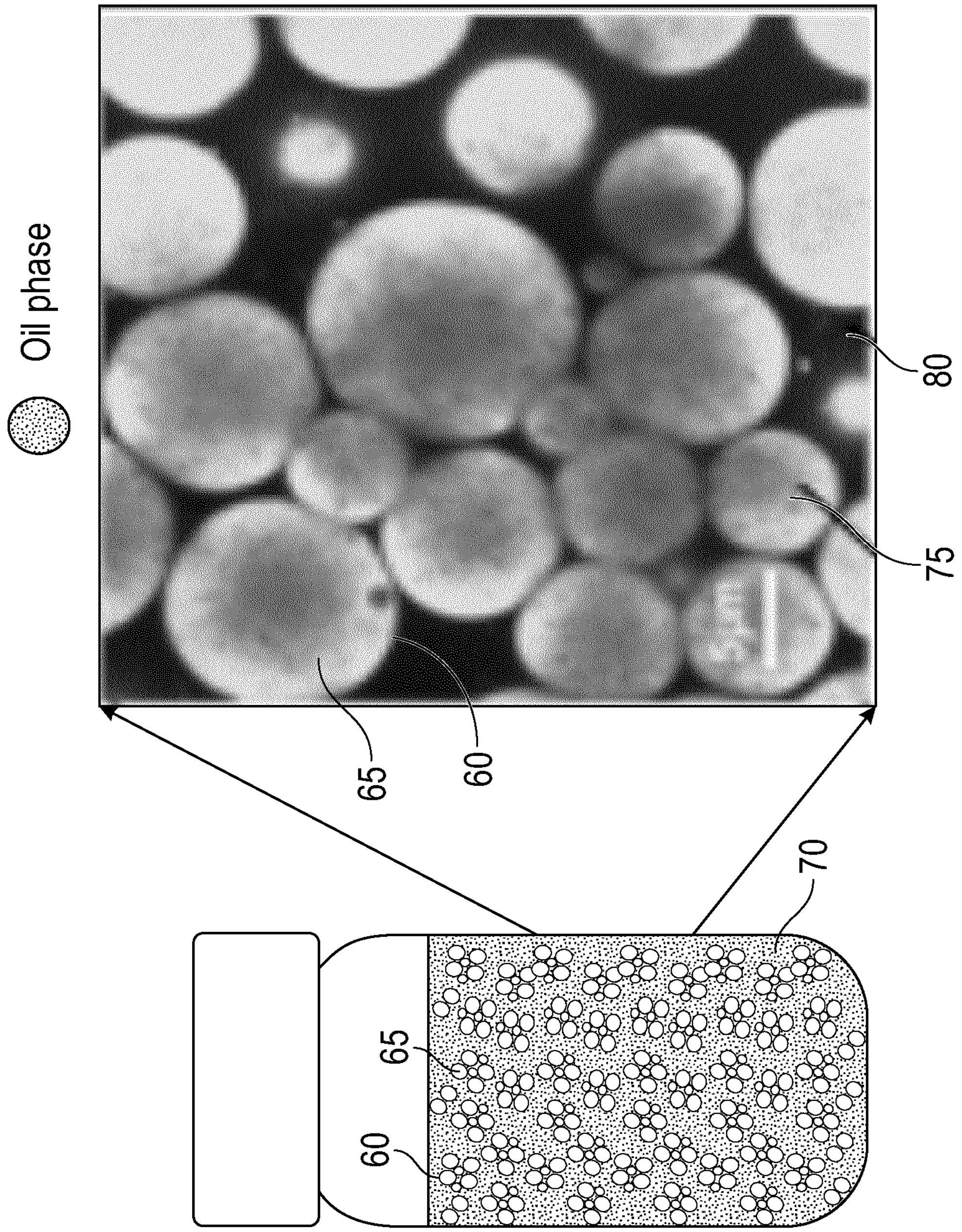
FIG. 16 is a graphic of clay coating oil droplet surfaces, and a fluorescent microscopy image showing oil droplets stabilized in a water phase.

FIG. 16 shows oil in water emulsions prepared with NCs as stabilizers one hour after preparation. A graphic shows clays coating oil droplet surfaces, and a fluorescent microscopy image shows oil droplets (shown in a lighter shade) stabilized in a water phase (shown in black). Nanoclays 60 cover oil droplets 65 that are suspended in solvent 70. Oil droplets 65 appear as fluorescent droplets 75 (shown here in a lighter shade) against black water phase 80 under a microscopic image.

Figure 17:
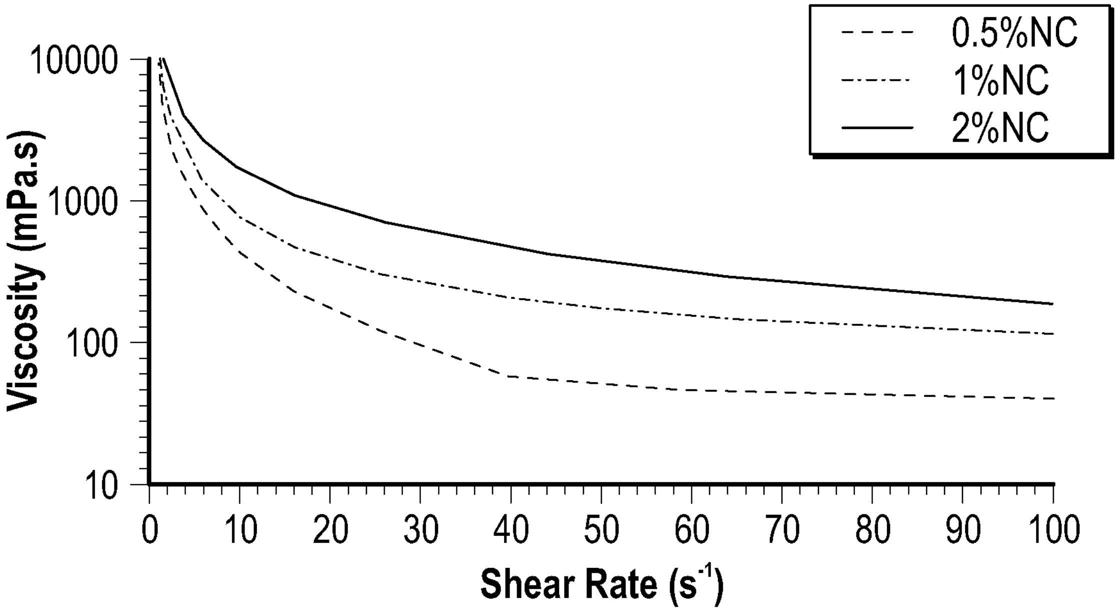
FIG. 17 is a graph showing NC viscosity vs. shear rate.

FIG. 17 is a graph showing NC viscosity vs. shear rate. NC viscosity decreases with increasing shear rate.

Figure 18:
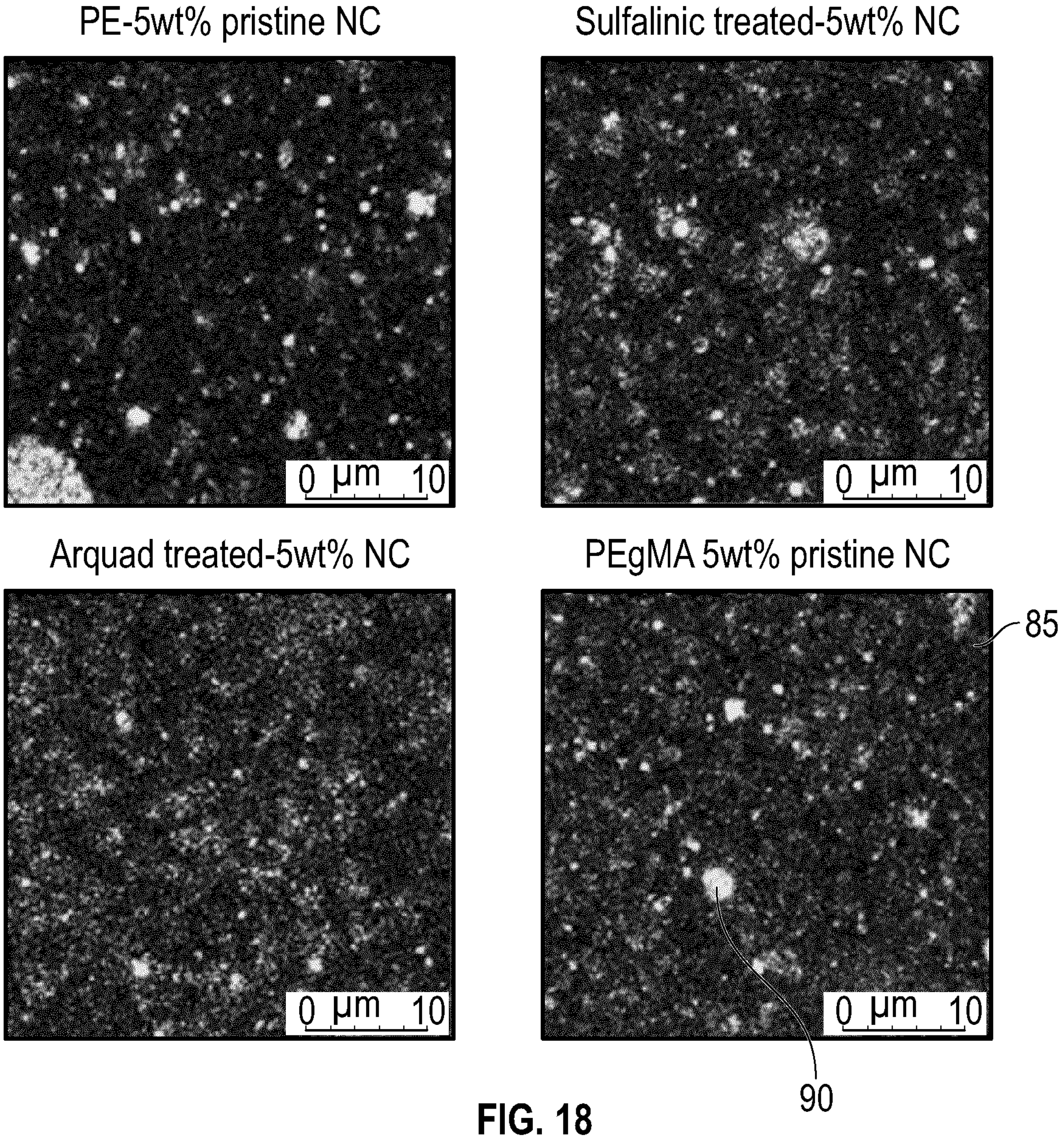
FIG. 18 is a series of reflectance microscopy images showing dispersion of NCs with or without organo-modification.

FIG. 18 show a series of reflectance microscopy images showing dispersion of NCs with or without organo-modification. NCs 90 are shown in a lighter shade against a water phase 85 (shown in black).

Figure 19:
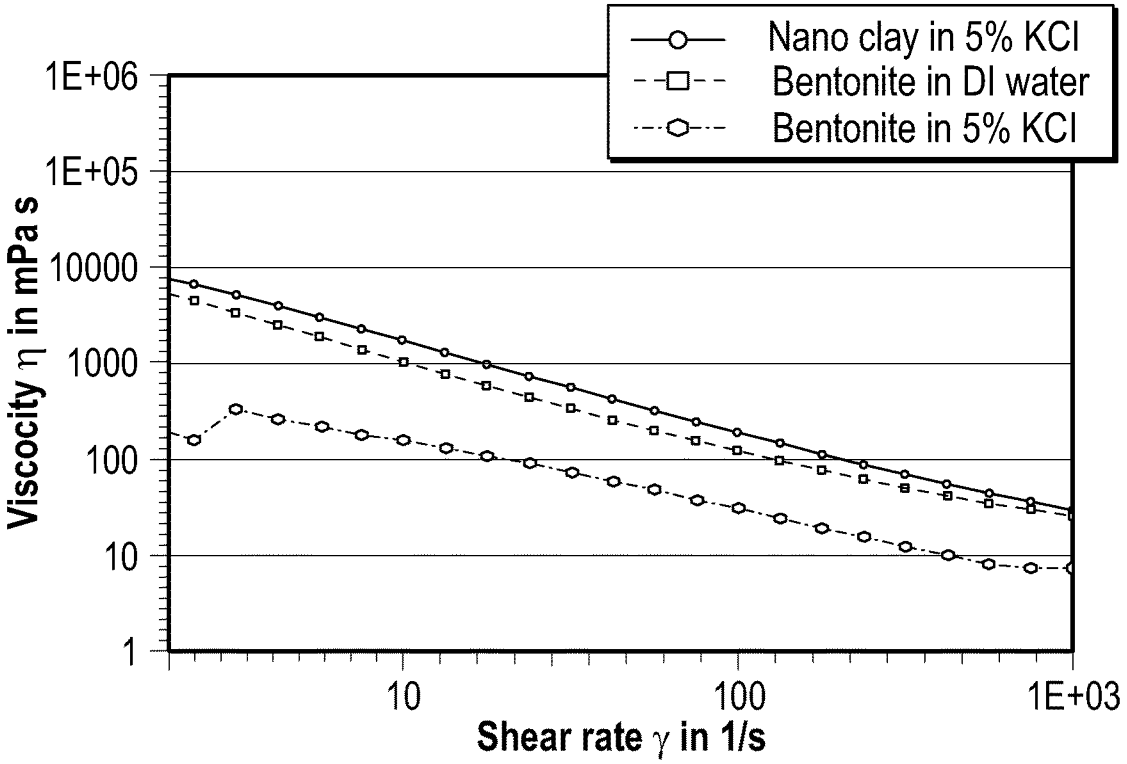
FIG. 19 is a graph showing the viscosity vs. shear rate profile for a NC in 5% KCl, bentonite in distilled ("DI") water, and bentonite in 5% KCl.

FIG. 19 shows the viscosity vs. shear rate profile for a NC in 5% KCl, bentonite in DI water, and bentonite in 5% KCl. NC viscosity decreases with increasing shear rate when NC is in 5% KCl.

Figure 20:
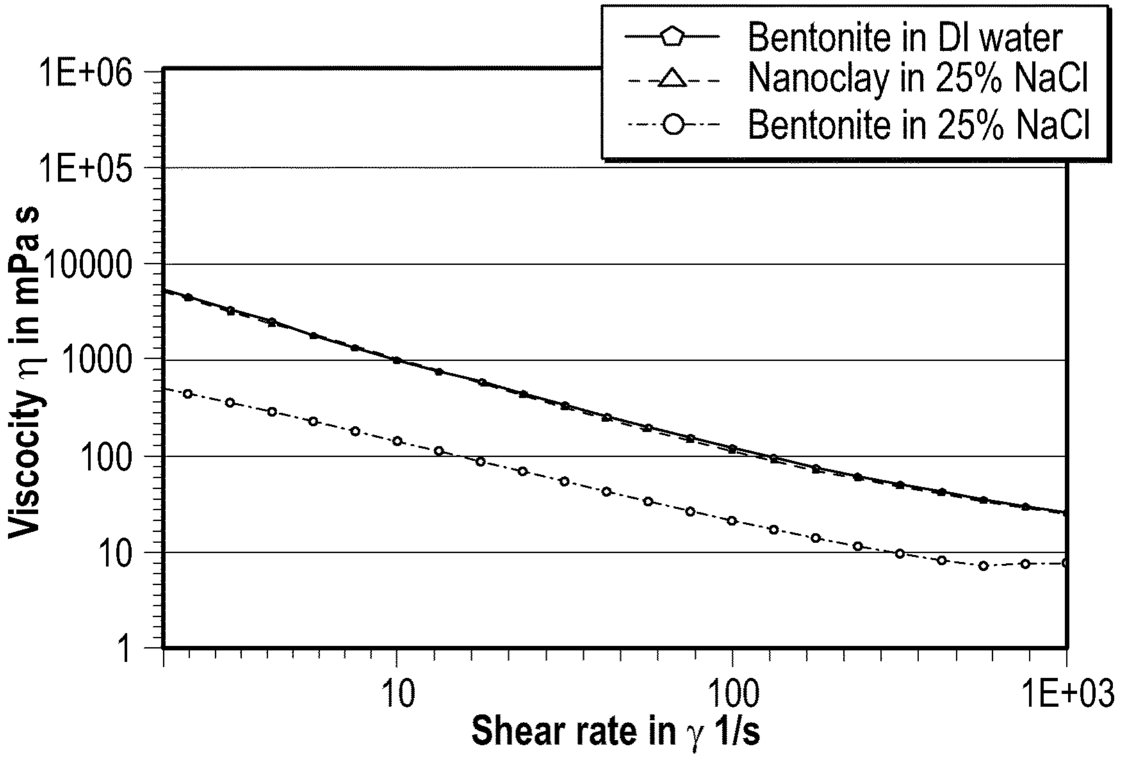
FIG. 20 is a graph showing the viscosity vs. shear rate profile for a NC in 25% NaCl, bentonite in DI water, and bentonite in 25% NaCl.

FIG. 20 shows the viscosity vs. shear rate profile for a NC in 25% NaCl, bentonite in DI water, and bentonite in 25% NaCl. NC viscosity decreases with increasing shear rate when NC is in 25% NaCl.

Figure 21:
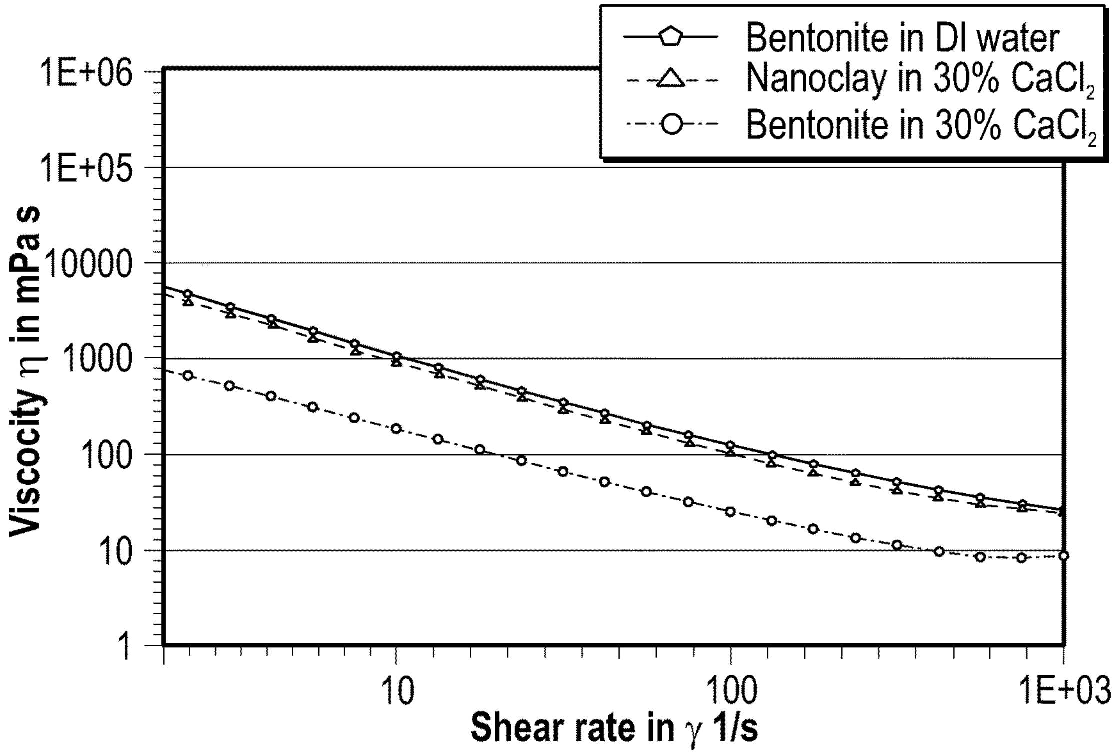
FIG. 21 is a photo showing the viscosity vs. shear rate profile for a NC in 30% CaCl2, bentonite in DI water, and bentonite in 30% CaCl2.

FIG. 21 shows the viscosity vs. shear rate profile for a NC in 30% $CaCl_2$, bentonite in DI water, and bentonite in 30% $CaCl_2$. NC viscosity decreases with increasing shear rate when NC is in 30% $CaCl_2$.

Figure 22:
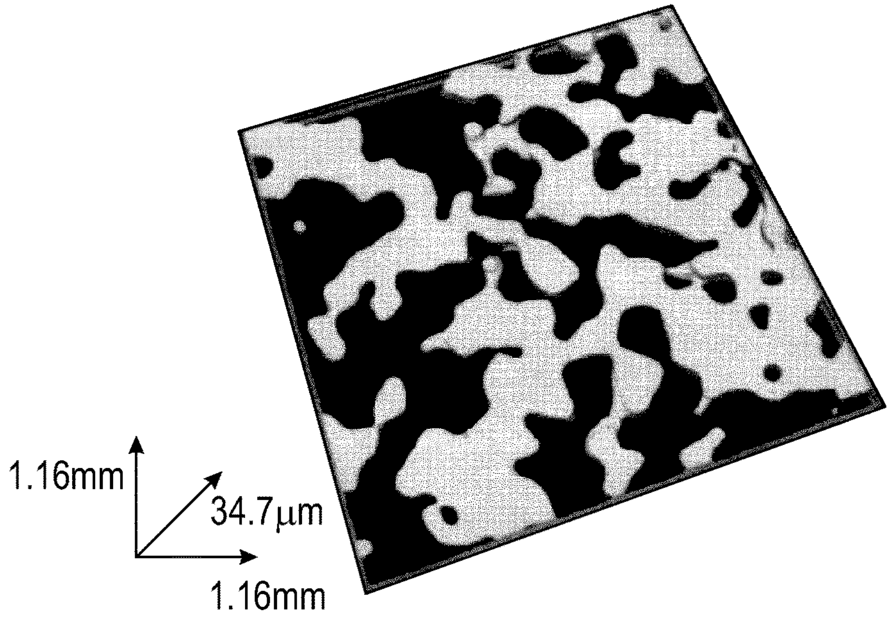
FIG. 22 is a photo of an oil in water emulsion prepared with nanoclays where oil droplets (shown in a lighter shade) are stabilized in a water phase (shown in a darker shade)

FIG. 22 shows an oil in water emulsion prepared with nanoclays where oil droplets (shown in a lighter shade) are shown stabilized in a water phase (shown in black).

Figure 23:
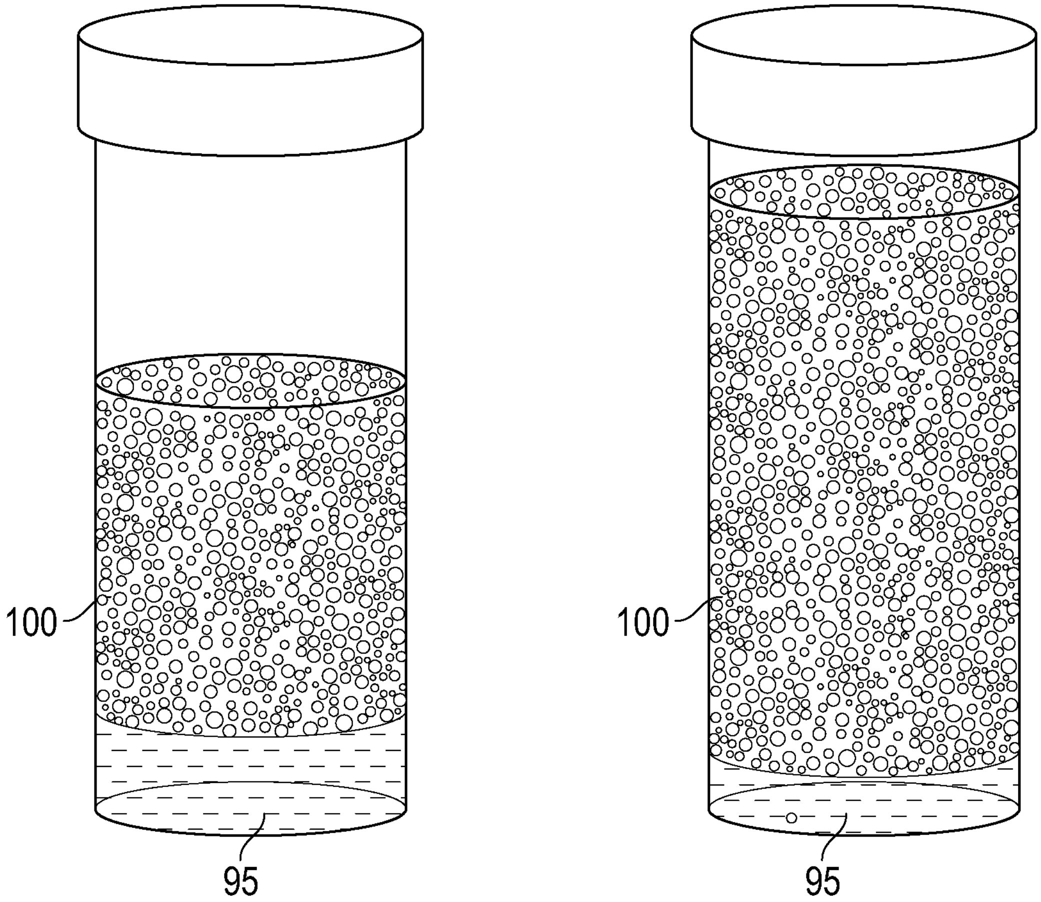
FIG. 23 is a diagram showing foams prepared with 0.3% surfactant alone in NaCl brine compared to foams prepared with 0.3% surfactant and NCs in NaCl brine.

FIG. 23 shows a side-by-side comparison of a foam prepared with surfactant only on the left vs. a foam prepared with NC and surfactant. Foams 100 are separate from solvent 95.

Industrial Applicability:

The invention is further illustrated by the following non-limiting examples.

Included in the following examples are the treatment of tailings slurries with different deflocculants. The MFTs have variable solids and bitumen content with solids content ranging from 30-33% by weight and bitumen content ranging from 1-5%. MFT pH ranged from 7-8.5, with methylene blue indices (MBI) in the range of 7.3-8.5 and sand to fine ratios (SFR) of 0.07-0.1. Table 1 provides ICP-MS elemental analysis of the typical FT water.

TABLE 1

| Concentration in ppm | | | |
|---|---|---|---|
| Na | Ca | Mg | K |
| 360-660.7 | 16.6-42.3 | 15.0-23.0 | 19.4-24.5 |

Example 1

An MFT underwent seven days of treatment. Released bitumen comprised the top layer of the segregated layers. An ultrafines layer mixed with water formed below the released bitumen. A bottom sediment formed below the ultrafines layer. An MFT was treated with sodium silicate and CaO. One week after treatment, the MFT showed solid sedimentation with the bottom sediment comprising sand, silt, and clay mineral over 300 nm in size and released water with an ultrafines concentration of 7% by weight.

Example 2

An MFT underwent six days of treatment. Released bitumen comprised the top layer of the segregated layers. An ultrafines layer mixed with water formed below the released bitumen. The ultrafines layer was about 9.8% by weight ultrafines. A bottom sediment formed below the ultrafines layer. The MFT had higher solids and bitumen content, six days following treatment with sodium silicate and CaO.

Example 3

An MFT was treated with sodium silicate. The MFT was treated with 2500 ppm of sodium silicate, 3000 ppm of sodium silicate, 4000 ppm of sodium silicate, and 5000 ppm of sodium silicate, for two months. An MFT was treated with varying dosage of sodium silicate: 2500 ppm of sodium silicate, 3000 ppm of sodium silicate, 4000 ppm of sodium silicate, 5000 ppm of sodium silicate, for two months, with the pH adjusted to 10 using sodium silicate. Bitumen and ultrafine layers formed for all sodium silicate dosages, with better separation achieved with higher dosages.

Example 4

An MFT (30% by weight solids and 1.3% bitumen) was treated with deflocculant sodium hexametaphosphate. MFT treated with sodium silicate was used for comparison. The MFT was treated with 8000 ppm of sodium hexametaphosphate and 5000 ppm of sodium silicate. Both treatments caused the MFT to form separate layers.

Example 5

An MFT was segregated and sedimented by 5000 ppm of deflocculating agent Darvan 811. The MFT was treated with 5000 ppm of Darvan 811 for months.

Example 6

An MFT was segregated and sedimented by organic dispersant Dolapix PC 67, which was used as a deflocculant. The MFT was treated with 5000 ppm of Dolapix pC 67 for two months.

Example 7

Several deflocculants were used in combination to deflocculate an MFT and cause sedimentation and segregation. The deflocculants included: 3000 ppm of sodium silicate in combination with 3000 ppm of Darvan 811; 4000 ppm of sodium silicate in combination with 1200 ppm of sodium carbonate; 6000 ppm of potassium silicate in combination with 2000 ppm of sodium carbonate; and 5000 ppm of sodium silicate in combination with 500 ppm of Dolapix PC 29. The MFTs treated with various deflocculation reagents: 3000 ppm of sodium silicate combined with 3000 ppm of Darvan 811; 4000 ppm of sodium silicate combined with 1200 ppm of sodium carbonate; 6000 ppm of potassium silicate combined with 2000 ppm of sodium carbonate; and 5000 ppm of sodium silicate combined with 500 ppm of Dolapix PC 29, all showed separation after two months of treatment.

Example 8

MFTs with different solids and bitumen content were diluted to 11% by weight of solids to mimic thin fine tails. MFT A had 32.84% by weight solids and 5.1% bitumen and MFT B had 30% by weight solids and 1.3% bitumen were treated with 5000 ppm of sodium silicate. Diluted MFTs underwent two months of treatment: MFT A diluted to 11% by weight and MFT B diluted to 11% by weight formed separate layers after two months of treatment.

Example 9

Released water from treated diluted MFT B was removed and replaced with fresh water. ASTM 50-70 mesh sand covered bottom sediment showing that destabilized fines are not released back into the water one week after sand raining. Sand capped MFT sediment remained in place post treatment.

Example 10

250 g of MFT (30% by weight solids and 1.3% bitumen) was treated with sodium silicate as deflocculant alone or assisted with CaO or sodium carbonate. All three samples had a different pH post treatment. The sedimentation behaviour of the treated MFT was apparent four months after treatment. MFTs treated with 3000 ppm of sodium silicate only (pH 9.2), 3000 ppm of sodium silicate with CaO to adjust the pH to 10, 3000 ppm of sodium silicate and 1000 ppm of sodium carbonate (pH 9.4) all segregated into layers.

Example 11

Laterite tailings slurry from nickel mining operations were subjected to deflocculation/dispersion using Darvan 7 dispersant (2% and 3% by weight of solids in tailings). Similar to MFT, sedimentation and segregation is seen where deflocculation/dispersion using Darvan 7 dispersant shows sedimentation behaviour after 24 hours and sedimentation behaviour after one week (2% and 3% by weight of solids in tailings). Laterite tailings treated with Darvan 7 deflocculant formed layers after 24 hours and after one week, with greater separation being achieved with one week vs. 24 hours.

Example 12

200 g of MFT (30% by weight solids and 1.3% bitumen) was deflocculated using a 4000 ppm (by weight of dry solids in MFT) of sodium silicate. The dewatered sludge and filtrate water was collected post filtration. The filtrate water had a solids concentration of less than 0.15% by weight. Solids within the filtered sludge achieved about 37% concentration.

Example 13

An ultrafines suspension was treated with 2% by weight of benzyl trimethyl ammonium hydroxide and centrifuged at 2400 g for five minutes. The solid content of the dewatered ultrafines sediment was 13% and compared to and ultrafines suspension without treatment. Ultrafines treated with 2% by weight of benzyl trimethyl ammonium hydroxide and centrifuged at 2400 g for five minutes had greater water release vs. ultrafines centrifuged at 2400 g for five minutes without treatment.

Example 14

MFT with solid content of 34.6% was treated with 2000 ppm, 5000 ppm, and 8000 ppm of benzyl trimethyl ammonium hydroxide and centrifuged at 1600 g for five minutes. Maximum dewatering of 50.7% was observed for 8000 ppm of benzyl trimethyl ammonium hydroxide. MFTs treated with different dosages of benzyl trimethyl ammonium hydroxide all experienced enhanced dewatering and increased solids content vs. untreated MFTs.

Example 15

MFT (30% by weight solids) was treated with other sources of organic cation such as tetra butyl ammonium hydroxide and tetra butyl phosphonium hydroxide. Treatment of MFT with 2000 ppm and 5000 ppm of benzyl trimethyl ammonium hydroxide, tetra butyl ammonium hydroxide, and tetra butyl phosphonium hydroxide resulted in dewatering. MFTs treated with benzyl trimethyl ammonium hydroxide, tetra butyl ammonium hydroxide, and tetra butyl phosphonium hydroxide followed by centrifugation at 1600 g for five minutes also resulted in dewatering.

Example 16

MFT (26% by weight solids) was treated with 8000 ppm of benzyl trimethyl ammonium hydroxide and was filtered under vacuum using a filter (11-micron pore size). Treatment with benzyl trimethyl ammonium cation resulted in the formation of an ultrafines layer with a 6.4% concentration and a bottom sediment, demonstrating that benzyl trimethyl ammonium cation is effective in dewatering of mature fine tailings.

Example 17

MFT was filtered to produce a sludge of ultrafines and were dewatered with benzyltrimethyl ammonium chloride. MFTs preconditioned with $CO_2$ underwent enhanced dewatering compared to MFTs not preconditioned with $CO_2$.

Example 18

Nanoclays were added to dodecane in water emulsions in a 1:1 ratio with. Emulsions with nanoclays at 0.1% by weight, 0.5% by weight, 1% by weight, and 2% by weight were mixed with the dodecane in water emulsions, as shown in photo after 1 hour. Stable emulsions were present in the nanoclay mixtures and dissociated liquids appeared for nanoclays at 0.1% by weight, 0.5% by weight, and 1% by weight after 1 hour. Emulsion with nanoclays at 0.1% by weight, 0.5% by weight, 1% by weight, and 2% by weight were mixed with the dodecane in water emulsions, after 5 days. Stable emulsions were present in the nanoclay mixtures and dissociated liquids appeared for nanoclays at 0.1% by weight, 0.5% by weight, 1% by weight and 2% by weight after 5 days.

Example 19

Foams were prepared with surfactant at a concentration of 0.3% by weight and nanoclays. Foams with nanoclays at 0.5% by weight, 1.0% by weight, 1.5% by weight, and surfactant alone were prepared in 8% NaCl brine and imaged immediately after mixing. Foams were present in the nanoclay mixtures and surfactant alone. Dissociated liquids appeared for nanoclays at 0.5% by weight, 1.0% by weight, 1.5% by weight, and surfactant alone immediately after mixing. Foams with nanoclays at 0.5% by weight, 1.0% by weight, 1.5% by weight, and surfactant alone were prepared in 8% NaCl brine and imaged 2 hours after mixing. Foams were present in the nanoclay mixtures and surfactant alone. Dissociated liquids appeared for nanoclays at 0.5% by weight, 1.0% by weight, 1.5% by weight, and surfactant alone 2 hours after mixing. Foams with nanoclays at 0.5% by weight, 1.0% by weight, 1.5% by weight, and surfactant alone were prepared in 8% NaCl brine and imaged 20 hours after mixing. Foams were present in the nanoclay mixtures and surfactant alone. Dissociated liquids appeared for nanoclays at 0.5% by weight, 1.0% by weight, 1.5% by weight, and surfactant alone 20 hours after mixing. Improved foamability, e.g., greater foam height, was achieved for all nanoclay concentrations immediately after mixing, 2 hours after mixing, and 20 hours after mixing compared to surfactant alone when 0.3% by weight surfactant was used.

Example 20

Foams were prepared with surfactant at a concentration of 0.5% by weight and nanoclays. Foams with nanoclays at 0.5% by weight, 1.0% by weight, 1.5% by weight, and surfactant alone were prepared in 8% NaCl brine and imaged immediately after mixing. Foams were present in the nanoclay mixtures and surfactant alone. Dissociated liquids appeared for nanoclays at 0.5% by weight, 1.0% by weight, 1.5% by weight, and surfactant alone immediately after mixing. Foams with nanoclays at 0.5% by weight, 1.0% by weight, 1.5% by weight, and surfactant alone were prepared in 8% NaCl brine and imaged 2 hours after mixing. Foams were present in the nanoclay mixtures and surfactant alone. Dissociated liquids appeared for nanoclays at 0.5% by weight, 1.0% by weight, 1.5% by weight, and surfactant alone 2 hours after mixing. Foams with nanoclays at 0.5% by weight, 1.0% by weight, 1.5% by weight, and surfactant alone were prepared in 8% NaCl brine and imaged 20 hours after mixing. Foams were present in the nanoclay mixtures and surfactant alone. Dissociated liquids appeared for nanoclays at 0.5% by weight, 1.0% by weight, 1.5% by weight, and surfactant alone 20 hours after mixing. Improved foamability, e.g., greater foam height, was achieved for all nanoclay concentrations immediately after mixing, 2 hours after mixing, and 20 hours after mixing compared to surfactant alone when 0.5% by weight surfactant was used.

Example 21

Foams were prepared with surfactant alone and with nanoclays and surfactant in the presence of crude oil. Surfactant was in all tests and was at a concentration of 0.3% by weight. Foams with nanoclays at a concentration of 0.5% by weight and surfactant alone were prepared in the presence of crude oil and imaged one minute after mixing. Foams were present in the nanoclay mixture and surfactant alone. Dissociated liquids appeared for nanoclays at 0.5% by weight and surfactant alone one minute after mixing. Foams with nanoclays at a concentration of 0.5% by weight and surfactant alone were prepared in the presence of crude oil and imaged two hours after mixing. Foams were present in the nanoclay mixture and surfactant alone. Dissociated liquids appeared for nanoclays at 0.5% by weight and surfactant alone two hours after mixing. Foams with nanoclays at a concentration of 0.5% by weight and surfactant alone were prepared in the presence of crude oil and imaged 24 hours after mixing. Foams were present in the nanoclay mixture and surfactant alone. Dissociated liquids appeared for nanoclays at 0.5% by weight and surfactant alone two hours after mixing. Improved foamability, e.g., greater foam height, was achieved for all nanoclay concentrations in crude oil 1 minute after mixing, 2 hours after mixing, and 24 hours after mixing compared to surfactant alone when 0.5% by weight surfactant was used.

Example 22

Bentonite clay and nanoclay in clay in aqueous 5 wt % KCl were allowed to settle. Bentonite clay with bentonite settled and an aqueous layer formed after 24 hours. Nanoclays in clay experienced no settling after 24 hours.

Example 23

Bentonite clay and nanoclay in clay in aqueous 25 wt % NaCl were allowed to settle. Bentonite clay with bentonite settled and an aqueous layer formed after 24 hours. Nanoclays in clay experienced no settling after 24 hours.

Example 24

Bentonite clay and nanoclay in clay in aqueous 30 wt % $CaCl_2$ were allowed to settle. Bentonite clay with bentonite settled and an aqueous layer formed after 24 hours. Nanoclays in clay experienced no settling after 24 hours.

Example 25

100 g of MFT (30% by weight solids and 1.3% bitumen) was deflocculated using a 4000 ppm (by wt. % of dry solids in MFT) of sodium silicate. The MFT was mixed using an overhead stirrer at 500 RPM and sodium silicate was added while the MFT was being mixed. The MFT and sodium silicate mixture was mixed for five minutes to ensure proper mixing. CaO was added to the mixture to raise the pH to 10 and further assist the deflocculating action of sodium silicate. After the mixing was stopped, the MFT was allowed to sediment and segregate under gravity.

Example 26

Ultrafines were sedimented at a slower rate and formed a sediment on top of the bottom sediment. The bottom sediment comprised mineral particles greater than 300 nm. Three weeks following treatment, the ultrafines concentration was reduced to 2% by weight in released water.

Example 27

100 g of MFT with higher solids and bitumen content (32.84% by weight solids and 5.1% bitumen) was deflocculated using 4000 ppm (by weight of dry solids in MFT) of sodium silicate and CaO. The amount of ultrafines in water was 9.85% by weight after 6 days.

Example 28

100 g of MFT (30% by weight solids and 1.3% bitumen) was treated with varying dosage of sodium silicate and CaO to adjust the pH to 10. The deflocculating action of the deflocculant and sedimentation of MFT was not adversely affected by the variation in the feed of MFT. MFTs were treated with (a) 2500 ppm of sodium silicate (b) 3000 ppm of sodium silicate (c) 4000 ppm of sodium silicate (d) 5000 ppm of sodium silicate, two months after treatment. In all examples, the bottom sediment with an ultrafines layer at the top was seen with concentration of ultrafines in water less than 0.6% by weight.

Example 29

An MFT (30% by weight solids and 1.3% bitumen) was treated with sodium hexametaphosphate as the deflocculant. The deflocculating action of only sodium silicate was also tested for comparison. CaO was not added to raise the pH to 10. Both sodium hexametaphosphate and sodium silicate were able to cause sedimentation and segregation in the MFT slurry with bottom sediment and ultrafines present in the released water seven days after treatment. The pH of tailings slurry after treatment with sodium hexametaphosphate was 7.7 and the pH of sodium silicate treated was 9.3.

Example 30

An MFT (30% by weight solids and 1.3% bitumen) was treated with an organic deflocculant with a commercial name of Darvan 811. Darvan 811 is a sodium polyacrylate based deflocculant. 5000 ppm of Darvan 811 deflocculated the MFT to cause segregation and sedimentation, similar to sodium silicate and sodium hexametaphosphate.

Example 31

An organic dispersant with a commercial name of Dolapix PC 67 was used as a deflocculant. Dolapix PC 67 is a sodium salt of polycarboxylic acid. Dolapix PC 67 caused sedimentation and segregation in the MFT owing to its strong deflocculating action.

Example 32

Several deflocculants were used in combination to deflocculate the MFT and cause sedimentation and segregation: (a) 3000 ppm of sodium silicate and 3000 ppm of Darvan 811 were combined; (b) 4000 ppm of sodium silicate was combined with 1200 ppm of sodium carbonate; (c) 6000 ppm of potassium silicate was combined with 2000 ppm of sodium carbonate; and (d) 5000 ppm of sodium silicate was combined with 500 ppm of Dolapix PC 29. The deflocculated MFT showed similar sedimentation and segregation behaviour regardless of the deflocculant being used.

Example 33

MFTs with different solids and bitumen content were diluted to 11% by weight of solids to mimic thin fine tails. MFT A had 32.84% by weight solids and 5.1% bitumen and MFT B had 30% by weight solids and 1.3% bitumen. Both MFT A and B were diluted to 11% by weight of solids and treated with 5000 ppm of sodium silicate. The pH of the resulting tailings slurry was 9.2-9.3 in both the cases. The dilution of the MFT resulted in faster sedimentation rate and all the minerals present in the tailings were sedimented over two months. In both the cases, similar size segregation was observed as in the case of MFT.

Example 34

Released water from treated diluted MFT B was removed and replaced with fresh water. ASTM 50-70 mesh sand was rained from the top to cover the sediment and showed that destabilized fines were not released back into the water.

Example 35

250 g of MFT (30% by weight solids and 1.3% bitumen) was treated with sodium silicate as deflocculant alone or assisted with CaO or sodium carbonate. All the three samples had a different pH post four-month treatment. For all the samples, ultrafines in the water has destabilized on top of the bottom sediment and clear water at the top. Both the ultrafines sediment and bottom sediment underwent consolidation with time.

Example 36

A laterite tailings slurry from the nickel mining operations was subjected to deflocculation/dispersion using Darvan 7 dispersant (2% and 3% by weight of solids in tailings). Similar to MFT, sedimentation and segregation was seen in FIG. 12 where (a) shows sedimentation behaviour after 24 hours and (b) sedimentation behaviour after one week. The smaller/finer mineral particles were slowest to settle and sedimented on top of the bottom sediment comprising of coarser minerals.

Example 37

200 g of MFT (30% by weight solids and 1.3% bitumen) was deflocculated using a 4000 ppm (by weight of dry solids in MFT) of sodium silicate. The released water with ultrafines (6.3% by weight after two weeks) were extracted and further dewatered by first coagulation with an organic ammonium cation, in this case benzyl trimethyl ammonium cation derived from benzyl trimethyl ammonium hydroxide, followed by mechanical separation using either vacuum filtration or centrifuge. Ultrafines suspension was coagulated using 2% by weight of benzyl trimethyl ammonium hydroxide (BTMAH). Prior to treatment, the pH of the benzyl trimethyl ammonium hydroxide was adjusted to 7-7.5 using $CO_2$ to avoid dispersion of clays at high pH. One minute after the addition of the organic ammonium cation, the gelled ultrafines suspension was dewatered using vacuum filtration using filter paper with a 2.5 μm pore size. The solid concentration of the filtered sludge was around 37%.

Example 38

An ultrafines suspension was treated with 2% by weight of benzyl trimethyl ammonium hydroxide and centrifuged at 2400 g for five minutes. The solid content of the dewatered ultrafines sediment was 13%. Without treatment with benzyl trimethyl ammonium hydroxide, dewatering of ultrafines was unsuccessful at 2400 g after four minutes with concentration of ultrafines with water was greater than 5% by weight.

Example 39

An MFT with solid content of 34.6% was treated with 2000 ppm, 5000 ppm and 8000 ppm of benzyl trimethyl ammonium hydroxide and centrifuged at 1600 g for five minutes. Maximum dewatering of 50.7% was observed for 8000 ppm of benzyl trimethyl ammonium hydroxide.

Example 40

An MFT (30% by weight solids) was treated with other sources of organic cation such as tetra butyl ammonium hydroxide and tetra butyl phosphonium hydroxide. Treatment of MFT was performed with 2000 ppm and 5000 ppm of benzyl trimethyl ammonium hydroxide, tetra butyl ammonium hydroxide and tetra butyl phosphonium hydroxide, respectively.

Example 41

An MFT (26% by weight solids) was treated with 8000 ppm of benzyl trimethyl ammonium hydroxide and was filtered under vacuum using a filter (11-micron pore size). The resulting filtered sediment reached 70% net water release after 30 min of filtration. Treatment with benzyl trimethyl ammonium cation was highly effective in dewatering of mature fine tailings.

Example 42

An MFT (30% by wt solids) was treated with 1500 ppm of sodium silicate and subjected to centrifugation at 1400 g for 5 minutes to extract ultrafines. The ultrafines extracted had a solids concentration of about 10% by weight. The ultrafine suspension pH was reduced to 6-6.5 using $CO_2$ before treatment with 10000 ppm of benzyl trimethyl ammonium chloride. The $CO_2$ pretreatment was performed to reduce the dispersion of clays by lowering the pH and reduce the amount of benzyl trimethyl ammonium cation needed for coagulation. The coagulated ultrafines clays were then subjected to pressure filtration at 100 psi for 60 minutes. The solid concentration of the filtered sludge was about 32%.

Example 43

An MFT (30% by weight solids) was treated with varying dosages of sodium silicate from 1000 ppm to 7000 ppm and subjected to centrifugation at 1400 g for 5 minutes to extract ultrafines. The ultrafines concentration was similar at all the concentrations ranging from about 9.7%-10.6% by weight in comparison to MFT without sodium silicate which had a solids concentration of about 13% by weight. Treatment of MFT with sodium silicate resulted in higher sedimentation in a centrifuge in comparison to untreated MFT.

Example 44

An MFT (26% by weight solids) was treated with varying dosages of benzyl trimethyl ammonium chloride from 1000 ppm to 4000 ppm with and without $CO_2$ conditioning prior to coagulation with benzyl trimethyl ammonium chloride. The coagulated sludge was dewatered using pressure filtration at 100 psi for a maximum of 60 minutes. The addition of $CO_2$ prior to coagulation reduced the minimum amount of benzyl trimethyl ammonium chloride needed for complete dewatering. $CO_2$ preconditioning reduced the filtration time required for full dewatering at same dosage.

Example 45

An MFT (26% by weight solids) was treated with varying dosages of benzyl trimethyl ammonium chloride from 2000 ppm to 4000 ppm with and without $CO_2$ conditioning prior to coagulation with benzyl trimethyl ammonium chloride. The coagulated sludge was then dewatered using a centrifuge at 1400 g for 5 minutes. The addition of $CO_2$ prior to coagulation resulted in lower number of solids in the water after centrifuge.

Example 46

Nanoclays (about 2% by weight of Portland cement) were mixed with Portland cement ("PC"). The dry components were combined while a suspension of nanoclay in water was prepared using a vortex mixer. Half the suspension was then mixed with the dry components followed by the remaining half to ensure good mixing and wetting of all components. The batch was then cast into two 2×1×0.5" rectangular moulds and eight 4" tall cylindrical moulds with a 2" diameter. The PC was compacted into the moulds by applying vibrational impact to the sides of the moulds to ensure no voids were present. To imitate 100% RH, the cylindrical moulds were covered with fitted lids and the rectangular moulds were covered with plastic. The plastic was removed after 24 hours, and the samples were de-moulded after 72 hours curing and remained at ambient temperature (15-20° C. and 20% RH) until their respective curing time (28 days). For comparison, Portland cement formulations were prepared in a similar manner without the addition of nanoclays. The Portland cement prepared with 2% by weight nanoclays had an 11.7% increase in compressive strength and a 25% increase in flexural strength after 28 days of curing in comparison to Portland cement formulations without nanoclays. Results are shown in Table 2.

TABLE 2

Portland cement formulation with 2% by weight nanoclay loading.

| Components | Mass (kg) | TOTAL Wt. % | Ratio |
|---|---|---|---|
| Portland cement mix | 2.3 | 14.60% | 1 |
| H2O | 1.87 | 11.90% | 0.81 |
| Sand | 4.59 | 29.30% | 2 |
| Gravel (1/2") | 6.89 | 43.90% | 3 |
| Nanoclay (non-calcined) | 0.05 | 0.29% | 0.02 |

Example 47

Magnesium oxide cement was mixed with NCs. The nanoclay suspension was made using the water and nanoclay amounts (about 2% by weight of MGO). $MgCl_2$ brine solution and nanoclay suspension were added to the mixer, followed by phosphoric acid. The mixture was stirred continuously for two minutes to ensure a homogenous mixture and to allow for adequate reaction time. Next, MgO of two particle sizes were added. The larger particle size MgO was added first followed by the smaller particle size MgO and mixed for a total of 20 minutes. Once a homogeneous mixture was formed, the fine grade and coarse grade perlite were added individually and mixed for one minute each time. Finally, the fly ash was added to the mixture and mixed for three minutes. The paste was then poured into two 2×1×0.5" rectangular moulds and eight 4" tall cylindrical moulds with a 2" diameter. Similar to the procedure noted above for PC, the samples were compacted using vibrational impact to the sides of the moulds. To imitate 100% RH, the cylindrical moulds were covered with fitted lids and the rectangular moulds were covered with plastic. This was removed after 24 hours, and the samples were de-moulded and remained at ambient temperature (15-20° C. and 20% RH) until their respective curing time (28 days). For comparison, MGO cement formulations were prepared in a similar manner without the addition of nanoclays. The MGO cement prepared with 2% by weight nanoclays had a 38% increase in compressive strength and 225% increase in flexural strength after 28 days of curing in comparison to MGO cement formulations without nanoclays.

Example 48

Oil sands tailings extracted nanoclays were used to prepare a 1% by weight suspension in water. The prepared nanoclay based nanofluid was used for enhanced oil recovery where nanofluid was injected into a sand pack saturated with heavy oil of 14 API. A sand pack (30.65 cm and 1.575 cm in length and width, respectively) was prepared using a 50-70 mesh sand. After packing, the sand pack was weighed to get the dry weight. Before saturating the sand pack with DI water, vacuuming was performed to remove the air in the system. After water saturation, the sand pack was weighed again to determine the porosity and pore volume of the sand pack. The permeability of the sand pack was determined by measuring the pressure drop across the water as a function of flow rate. The prepared sand pack had a porosity of 35±1% and permeability of 33±2 D. The prepared water saturated sand pack was then saturated with heavy oil and aged overnight. Following heavy oil saturation, water was injected at a flowrate of 1 mL/min ("water flood") until a plateau in oil recovery was reached. Following water flood, 2 PV of nanoclay based nanofluid was injected at a flowrate of 1 mL/min which was then followed by chase water flood. The nanoclay injection mobilised the trapped heavy oil left behind and resulted in 32% additional heavy oil recovery post water flood. The increase in heavy oil recovery was attributed to the emulsification of heavy oil in presence of heavy oil and possible wettability alternation of the porous media.

Example 49

A 2% by weight nanoclay suspension was prepared in water to test the emulsification properties of nanoclays. First paraffin oil was added to the nanoclay suspension so that the final oil to water ratio was 1:1. Then the oil water mixture was homogenized for two minutes to form paraffin oil in water emulsion. Nanoclays acted as an emulsion stabilizer for paraffin oil in water emulsions. Paraffin oil was replaced with bitumen. The oil to water ratio for bitumen was 2:3. The mixture was heated to 80° C. to reduce the bitumen viscosity for mixing before homogenization. Nanoclays acted as an emulsion stabilizer for bitumen in water emulsions. Emulsion pictures were taken one hour after preparation showing a fluorescence microscopic image of oil in water emulsions and bitumen in water emulsions stabilized by nanoclays.

Example 50

Dodecane in water emulsions (1:1) were prepared with nanoclay concentrations ranging from 0.1% by weight to 2% by weight to understand the effect of various nanoclay concentrations on emulsion stability. An emulsion prepared with 0.1% by weight nanoclays was not stable and some coalescence was observed after five days. The minimum concentration required for stability against coalescence was 0.5% by weight nanoclays. Increasing the nanoclay concentration also led to increasing creaming stability. Emulsion viscosity also increased as the nanoclay concentration was increased because of the smaller dodecane droplet size and strong network of nanoclays between the droplets.

These examples showed that NCs exhibited excellent interfacial properties to stabilize an oil in water emulsion. The interfacial properties may be applied to enhance oil recovery and for preparing asphalt emulsions for paving and non-paving applications.

Example 51

Nanoclays at concentrations of 0.5%, 1%, and 1.5% by weight were added to a solution of anionic surfactant in 8% NaCl brine. The nanoclays and surfactant solutions were sonicated using a sonicator for two minutes to ensure homogenous dispersion and avoid particle aggregation. Foam tests were conducted by a Bartsch shaking method. 10 mL of nanoclay and surfactant solutions were shaken vigorously for 15 seconds in a 50 mL plastic tube and foam height and stability were measured with time. The gas phase for these foam tests was air.

Foams were prepared with a surfactant concentration of 0.3% by weight with and without nanoclays at a concentration varying from 0.5% by weight to 1.5% by weight in 8% by weight NaCl brine. The addition of nanoclays improved the foamability (increased foam height) and long-term foam stability in comparison to surfactant only. Nanoclays in combination with a surfactant improved foam stability by forming a strong network in the lamellae, thereby reducing foam drainage due to increased aqueous phase viscosity. Furthermore, the nanoclays also prevented coalescence by adsorption around the foam bubbles.

Foams were prepared with a surfactant concentration of 0.5% by weight with and without nanoclays at a concentration varying from 0.5% by weight to 1.5% by weight in 8% by weight NaCl brine. A foam of surfactant only at a concentration of 0.5% by weight in 8% by weight NaCl brine was used as a control. The addition of nanoclays improved the foamability and long-term stability of foams in 8% NaCl brine immediately after mixing and after two hours and 20 hours.

Foams were prepared with a surfactant at a concentration of 0.3% by weight with and without nanoclays at a concentration of 0.5% by weight in the presence of crude oil. The surfactant only foam collapsed in the presence of crude oil. However, a foam of surfactant at a concentration of 0.3% by weight and nanoclay at a concentration of 0.5% produced a stabilized foam after two hours and 24 hours in presence of crude oil.

Example 52

Polyethylene (PE) was chosen to test the dispersibility of nanoclays in a polymer matrix. Pristine nanoclays were poorly dispersed in the PE polymer matrix due to the hydrophilic nature of the nanoclays. However, dispersibility was improved after nanoclays were organo-modified with either di(hydrogenated tallow)dimethylammonium chloride or sulfanilic acid as evidenced by less visible aggregates. Di(hydrogenated tallow)dimethylammonium chloride is a popular quaternary ammonium compound for organo-modification of clays and performed the best in this example. PE was grafted with maleic anhydride ("PEgMA") which acted as compatibilizer to improve non-treated nanoclay dispersion in non-polar PE. PEgMA showed better dispersion of pristine nanoclays. The results showed that nanoclays can be incorporated into polymers for preparing nanocomposites with sufficient organo-modification or an appropriate compatibilizer to improve the mechanical, thermal and barrier properties.

Example 53

Nanoclays were tested as a viscosifier of drilling/kill muds in saline water. A nanoclay suspension (6.4% by weight) was prepared in 5% KCl brine, 25% NaCl brine, and 30% $CaCl_2$ brine. For preparation, dried nanoclays were added to the brines and mixed using a rotor stator homogenizer for 5 minutes. As a control, bentonite clay suspension (6.4% by weight) was prepared in deionized water and brine. Nanoclays were able to viscosify KCl, NaCl, and $CaCl_2$ brines unlike bentonite which did not viscosify brine. No settling was observed for nanoclays in brine after 24 hours. In contrast, there was settling in the bentonite suspension after 24 hours. The results showed that nanoclays can be used as low-cost viscosifiers for drilling and/or kill muds in brine as an alternative to polymers.

Example 54

Nanoclays were tested as a stabilizer for water-lutidine mixtures to preserve the bi-continuous morphology. The formation of water-lutidine bijels was performed as per a typical water-lutidine bijel procedure, whereby a critical water-lutidine (~72 wt. % water) mixture was prepared with a defined concentration of nanoclays and subject to a temperature ramp as to induce water-lutidine demixing via spinodal decomposition. The water-lutidine mixtures began in the one-phase region at 30° C. and were rapidly quenched into the 2-phase region (lower critical solution temperature (LCST), 34.1° C.) by heating to 55° C. at a rate of 25° C. per minute.

Example 55

Nanoclays were extracted from two different sets of tailings. The first set of tailings ("Tailings 1") had a solid and bitumen content of 24.5% and 1.1% by weight respectively. The second set of tailings (Tailings 2) had a solid and bitumen content of 33% and 3.5% by weight respectively. Nanoclays were extracted from Tailings 1 and Tailings 2 after treatment with sodium silicate and centrifuge time of 3 mins and 5 mins. The extracted nanoclays were further dewatered using a combination of benzyl trimethyl ammonium chloride as a coagulant and filtration at 100 psi for 60 mins. The resulting nanoclay cake was dried and used for cement mortars tested for compressive strength according to ASTM C109. For Tailings 1, addition of 2% of nanoclays with 3 mins and 5 mins of centrifugation time resulted in an increase in compressive strength by 26.3% and 5.6% respectively. For Tailings 2, addition of 2% of nanoclays with 3 mins and 5 mins of centrifugation time resulted in an increase in compressive strength by 2.5% and 12.2% respectively. Results are shown in Table 3.

TABLE 3

| Sample | 28-day compressive strength (MPa) |
|---|---|
| Reference | 31.9 |
| Tailings 1 NC (3 mins) | 40.3 |
| Tailings 1 NC (5 mins) | 33.7 |
| Tailings 2 NC (3 mins) | 32.7 |
| Tailings 2 NC (5 mins) | 35.8 |

The preceding examples can be repeated with similar success by substituting the generically or specifically described reactants and/or operating conditions of this invention for those used in the preceding examples.

Embodiments of the present invention provide a technology-based solution that overcomes existing problems with the current state of the art in a technical way to satisfy an existing problem for mining operators seeking to reduce environmental liability and reclaim processed water from mining tailings. Embodiments of the present invention achieve important benefits over the current state of the art, such as reduced environmental impact, faster water reclamation, and recovery of valuable clay ultrafines. Some of the unconventional steps of embodiments of the present invention include adding deflocculant to mineral tailings to sediment and segregate tailings components and retrieving clay ultrafines from mineral tailings.

Note that in the specification and claims, "about" or "approximate" or "approximately" mean within twenty percent (20%) of the numerical amount cited.

Although the invention has been described in detail with particular reference to these embodiments, other embodiments can achieve the same results. Variations and modifications of the present invention will be obvious to those skilled in the art and it is intended to cover all such modifications and equivalents. The entire disclosures of all references, applications, patents, and publications cited above and/or in the attachments, and of the corresponding applications, are hereby incorporated by reference.

What is claimed is:

1. A method for destabilizing tailings, the method comprising:

contacting the tailings with a deflocculant, wherein the tailings comprise a clay;

adjusting a pH level of the tailings with the deflocculant;

adsorbing the deflocculant onto the clay; and segregating the tailings into a plurality of layers.

2. The method of claim 1 wherein at least one of the plurality of layers comprises layers having a greater density disposed below layers having a lesser density.

3. The method of claim 1 wherein at least one of the plurality of layers comprises a bitumen layer.

4. The method of claim 1 wherein at least one of the plurality of layers comprises ultrafines.

5. The method of claim 1 wherein the deflocculant comprises an inorganic deflocculant.

6. The method of claim 1 wherein the deflocculant comprises an organic deflocculant.

7. The method of claim 1 wherein adsorbing the deflocculant onto the clay creates an electrostatic repulsive force.

8. The method of claim 1 wherein adsorbing the deflocculant onto the clay creates an electro-steric repulsive force.

9. The method of claim 1 further comprising contacting the tailings with an alkali.

10. The method of claim 1 wherein the pH is adjusted to a range of pH 7 to pH 10.

11. The method of claim 1 further comprising dewatering the tailings.

12. The method of claim 1 further comprising extracting a nanoclay from the tailings.

13. The method of claim 12 wherein extracting the nanoclay from the tailings comprises contacting the tailings with a reagent.

14. The method of claim 1 wherein the concentration of the deflocculant is in the range of about 1000 ppm to about 9000 ppm.

* * * * *